(12) United States Patent
Reed

(10) Patent No.: US 9,210,759 B2
(45) Date of Patent: Dec. 8, 2015

(54) LUMINAIRE WITH AMBIENT SENSING AND AUTONOMOUS CONTROL CAPABILITIES

(71) Applicant: Express Imaging Systems, LLC, Seattle, WA (US)

(72) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 27 days.

(21) Appl. No.: 13/786,332

(22) Filed: Mar. 5, 2013

(65) Prior Publication Data

US 2014/0139116 A1 May 22, 2014

Related U.S. Application Data

(60) Provisional application No. 61/728,150, filed on Nov. 19, 2012.

(51) Int. Cl.
| H05B 37/02 | (2006.01) |
| G08G 1/00 | (2006.01) |
| H05B 33/08 | (2006.01) |

(52) U.S. Cl.
CPC ........ *H05B 33/0854* (2013.01); *H05B 37/0218* (2013.01); *H05B 37/0227* (2013.01); *H05B 37/0272* (2013.01); *H05B 37/0281* (2013.01)

(58) Field of Classification Search
USPC .......... 315/149–159, 291, 312; 340/901, 910, 340/917, 931, 933
See application file for complete search history.

(56) References Cited

U.S. PATENT DOCUMENTS

| 2,745,055 A | 5/1956 | Woerdemann |
| 4,153,927 A | 5/1979 | Owens |
| 4,237,377 A | 12/1980 | Sansum |

(Continued)

FOREIGN PATENT DOCUMENTS

| DE | 4001980 A1 | 8/1990 |
| EP | 1 734 795 A1 | 12/2006 |

(Continued)

OTHER PUBLICATIONS

Reed et al., "Apparatus and Method for Schedule Based Operation of a Luminaire," Office Action mailed Mar. 26, 2014, for U.S. Appl. No. 13/604,327, 10 pages.

(Continued)

*Primary Examiner* — Tung X Le
(74) *Attorney, Agent, or Firm* — Seed IP Law Group PLLC

(57) ABSTRACT

A number of luminaires can be communicably coupled and networked. Some or all of the luminaires may be equipped with a number of sensors including motion sensors. Upon detecting motion of an object in the vicinity of a luminaire, the luminaire can increase the luminous output of the lighting subsystem in the luminaire and communicate a targeted or broadcast output signal to some or all of the remaining luminaires in the network. The output signal may variously contain data indicative of one or more parameters related to motion of the object (direction of travel, velocity, etc.) or one or more parameters related to the increased luminous output of the luminaire. Responsive to the receipt of an output signal generated by another luminaire, the luminaire may autonomously adjust the luminous output of the lighting subsystems responsive to an event detected by the other luminaire.

63 Claims, 6 Drawing Sheets

(56) References Cited

U.S. PATENT DOCUMENTS

| | | | |
|---|---|---|---|
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,838,226 A | 11/1998 | Houggy et al. | |
| 6,111,739 A | 8/2000 | Wu et al. | |
| 6,377,191 B1 | 4/2002 | Takubo | |
| 6,612,720 B1 | 9/2003 | Beadle | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,902,292 B2 | 6/2005 | Lai | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,281,820 B2 | 10/2007 | Bayat et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,703,951 B2 | 4/2010 | Piepgras et al. | |
| 7,804,200 B2 | 9/2010 | Flaherty | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,334,640 B2 | 12/2012 | Reed et al. | |
| 8,390,475 B2* | 3/2013 | Feroldi | 340/901 |
| 8,749,403 B2* | 6/2014 | King et al. | 340/932.2 |
| 2002/0113192 A1 | 8/2002 | Antila | |
| 2003/0016143 A1* | 1/2003 | Ghazarian | 340/901 |
| 2003/0184672 A1 | 10/2003 | Wu et al. | |
| 2004/0192227 A1 | 9/2004 | Beach et al. | |
| 2006/0014118 A1 | 1/2006 | Utama | |
| 2006/0066264 A1 | 3/2006 | Ishigaki et al. | |
| 2007/0032990 A1 | 2/2007 | Williams et al. | |
| 2007/0102033 A1 | 5/2007 | Petrocy | |
| 2007/0225933 A1 | 9/2007 | Shimomura | |
| 2008/0018261 A1 | 1/2008 | Kastner | |
| 2008/0043106 A1 | 2/2008 | Hassapis et al. | |
| 2008/0130304 A1 | 6/2008 | Rash et al. | |
| 2008/0266839 A1 | 10/2008 | Claypool et al. | |
| 2009/0046151 A1 | 2/2009 | Nagaoka et al. | |
| 2009/0058320 A1 | 3/2009 | Chou et al. | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0195179 A1 | 8/2009 | Joseph et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0278479 A1 | 11/2009 | Platner et al. | |
| 2009/0284155 A1 | 11/2009 | Reed et al. | |
| 2009/0315485 A1 | 12/2009 | Verfuerth et al. | |
| 2010/0001652 A1* | 1/2010 | Damsleth | 315/149 |
| 2010/0052557 A1 | 3/2010 | Van Der Veen et al. | |
| 2010/0123403 A1 | 5/2010 | Reed | |
| 2010/0171442 A1 | 7/2010 | Draper et al. | |
| 2010/0246168 A1 | 9/2010 | Verfuerth et al. | |
| 2010/0259193 A1 | 10/2010 | Umezawa et al. | |
| 2010/0271802 A1 | 10/2010 | Recker et al. | |
| 2010/0277082 A1 | 11/2010 | Reed et al. | |
| 2010/0295454 A1 | 11/2010 | Reed | |
| 2010/0295455 A1 | 11/2010 | Reed | |
| 2010/0295946 A1 | 11/2010 | Reed et al. | |
| 2010/0309310 A1 | 12/2010 | Albright | |
| 2011/0001626 A1 | 1/2011 | Yip et al. | |
| 2011/0006703 A1 | 1/2011 | Wu et al. | |
| 2011/0026264 A1 | 2/2011 | Reed et al. | |
| 2011/0175518 A1 | 7/2011 | Reed et al. | |
| 2011/0221346 A1 | 9/2011 | Lee et al. | |
| 2011/0251751 A1 | 10/2011 | Knight | |
| 2011/0310605 A1 | 12/2011 | Renn et al. | |
| 2012/0001566 A1 | 1/2012 | Josefowicz et al. | |
| 2012/0019971 A1 | 1/2012 | Flaherty et al. | |
| 2012/0038490 A1* | 2/2012 | Verfuerth | 340/910 |
| 2012/0146518 A1* | 6/2012 | Keating et al. | 315/153 |
| 2012/0169053 A1 | 7/2012 | Tchoryk, Jr. et al. | |
| 2012/0221154 A1 | 8/2012 | Runge | |
| 2012/0262069 A1 | 10/2012 | Reed | |
| 2013/0043792 A1 | 2/2013 | Reed | |
| 2013/0049613 A1 | 2/2013 | Reed | |
| 2013/0126715 A1 | 5/2013 | Flaherty | |
| 2013/0141000 A1 | 6/2013 | Wei et al. | |
| 2013/0141010 A1 | 6/2013 | Reed et al. | |
| 2013/0163243 A1 | 6/2013 | Reed | |
| 2013/0229518 A1 | 9/2013 | Reed et al. | |
| 2013/0235202 A1 | 9/2013 | Nagaoka et al. | |
| 2013/0340353 A1 | 12/2013 | Whiting et al. | |
| 2014/0001961 A1* | 1/2014 | Anderson et al. | 315/153 |
| 2015/0015716 A1 | 1/2015 | Reed et al. | |

FOREIGN PATENT DOCUMENTS

| | | |
|---|---|---|
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 2005078403 A | 8/2005 |
| KR | 10-2006-0086254 A | 7/2006 |
| KR | 10-2009-0042400 A | 4/2009 |
| KR | 10-0935736 B1 | 1/2010 |

(56) References Cited

FOREIGN PATENT DOCUMENTS

| KR | 20-2010-0007230 U | 7/2010 |
|---|---|---|
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Reed et al., "Long-Range Motion Detection for Illumination Control," Amendment filed Apr. 28, 2014, for U.S. Appl. No. 12/784,080, 20 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr..., 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Oct. 8, 2012 for PCT/US2012/033059, 3 pages.
Littelfuse, "Application Note: Protecting LEDs in Product Designs," 2009, 2 pages.
Panasonic Electronic Components, "LED Lighting Solutions," 2009, 6 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Oct. 8, 2012 for PCT/US2012/033059, 3 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Gas-Discharge Lamp Replacement," U.S. Appl. No. 61/052,924, filed May 13, 2008, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Systems and Methods That Employ Object Recognition," U.S. Appl. No. 13/411,321, filed Mar. 2, 2012, 51 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Electrostatic Discharge Protection for Luminaire," Office Action mailed Mar. 15, 2013 for U.S. Appl. No. 13/212,074, 11 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Turbulent Flow Cooling for Electronic Ballast," U.S. Appl. No. 61/088,651, filed Aug. 13, 2008, 23 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Luminaire With Atmospheric Electrical Activity Detection and Visual Alert Capabilities," U.S. Appl. No. 13/786,114, filed Mar. 5, 2013, 52 pages.
Reed, "Resonant Network for Reduction of Flicker Perception in Solid State Lighting Systems," U.S. Appl. No. 61/527,029, filed Aug. 24, 2011, 41 pages.
Renn et al., "Solid State Lighting Device and Method Employing Heat Exchanger Thermally Coupled Circuit Board," U.S. Appl. No. 61/357,421, filed Jun. 22, 2010, 49 pages.
International Search Report, mailed Nov. 19, 2013 for PCT/US2013/052092, 4 pages.
International Search Report, mailed Dec. 30, 2013 for PCT/US2013/058266, 3 pages.

(56) References Cited

OTHER PUBLICATIONS

Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
International Search Report mailed Nov. 11, 2014, for International Application No. PCT/US2014/047867, 3 pages.
Reed et al., "Systems and Methods That Employ Object Recognition," Amendment filed Nov. 21, 2014, for U.S. Appl. No. 13/411,321, 20 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," U.S. Appl. No. 14/557,275, filed Dec. 1, 2014, 92 pages.
Reed, "Asset Management System for Outdoor Luminaires," U.S. Appl. No. 62/082,463, filed Nov. 20, 2014, 56 pages.
Reed, "Centralized Control of Area Lighting Hours of Illumination," U.S. Appl. No. 62/057,419, filed Sep. 30, 2014, 39 pages.
Reed, "Detection and Correction of Faulty Photo Controls in Outdoor Luminaires," U.S. Appl. No. 62/068,517, filed Oct. 24, 2014, 47 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Sep. 30, 2011 for PCT/US2011/021359, 3 pages.
International Search Report, mailed Jan. 14, 2013 for PCT/US2012/052009, 3 pages.
International Search Report, mailed Feb. 27, 2013 for PCT/US2012/065476, 3 pages.
Kadirvel et al., "Self-Powered, Ambient Light Sensor Using bq25504," Texas Instruments, Application Report, SLUA629—Jan. 2012, 6 pages.
Reed et al., "Adjustable Output Solid-State Lamp With Security Features," U.S. Appl. No. 61/561,616, filed Nov. 18, 2011, 33 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.

Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
Written Opinion mailed Sep. 30, 2011 for PCT/US2011/021359, 4 pages.
Written Opinion, mailed Jan. 14, 2013 for PCT/US2012/052009, 5 pages.
Written Opinion, mailed Feb. 27, 2013, for PCT/US2012/065476, 8 pages.

(56) References Cited

OTHER PUBLICATIONS

Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Aug. 14, 2014, for U.S. Appl. No. 12/619,535, 16 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
International Search Report, mailed Feb. 26, 2014, for PCT/US2013/070794, 3 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Written Opinion, mailed Feb. 26, 2014, for PCT/US2013/070794, 10 pages.
Japanese Office Action, dated Jan. 6, 2015, for corresponding Japanese Application No. 2011-536564, 6 pages.
Reed et al., "Apparatus and Method for Schedule Based Operation of a Luminaire," U.S. Appl. No. 14/552,274, filed Nov. 24, 2014, 44 pages.
Reed et al., "Apparatus and Method for Schedule Based Operation of a Luminaire," Office Action mailed Mar. 2, 2015, for U.S. Appl. No. 14/552,274, 7 pages.
Reed et al., "Apparatus and Method of Operating a Luminaire," Office Action mailed Dec. 22, 2014, for U.S. Appl. No. 13/558,191, 17 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Office Acton mailed Jan. 2, 2015, for U.S. Appl. No. 13/707,123, 24 pages.
Reed, "Electronic Control to Regulate Power for Solid-State Lighting and Methods Thereof," Amendment filed Dec. 15, 2014, for U.S. Appl. No. 12/619,535, 21 pages.

\* cited by examiner

LUMINAIRE WITH AMBIENT SENSING AND AUTONOMOUS CONTROL CAPABILITIES

BACKGROUND

1. Technical Field

The present disclosure generally relates to the field of illumination devices and, more particularly, to the autonomous operation of illumination devices and systems.

2. Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

To simplify power distribution and control wiring, such luminaires are often organized into groups or similar hierarchical power and control structures. For example, multiple luminaires along a roadway may be grouped together on a common power circuit that is controlled using a single, centralized, controller to collectively adjust the luminous output of all of the luminaires in the group. In another instance, multiple luminaires within a parking garage may be controlled using a single photocell mounted on the exterior of the parking garage. Such installations may however compromise operational flexibility for ease of installation and simplicity of operation.

In the face of an increased demand by legislators, power providers, and system users for energy efficiency and in light of an increased demand for safer, well illuminated, public and private spaces requirements, new strategies for the control of luminaires are needed.

BRIEF SUMMARY

Lighting systems including a number of illumination devices such as luminaires enjoy pervasive and widespread use in industrial, commercial and municipal environments. Such systems are relied upon to provide a generally constant level of illumination sufficient to meet the needs of the normal activity performed or the conditions commonly encountered in a given area. Thus, lighting systems in industrial environments may be designed to provide a relatively high level of illumination at grade sufficient for workers to safely perform their duties. Lighting systems in commercial environments, such as interior and exterior parking lots, may be designed to provide a relatively moderate level of illumination at grade that is sufficient to provide a sense of security and well-being to business patrons and employees as they transit the area either in vehicles or on foot. Lighting systems in municipal environments, such as along roadways and sidewalks, may be designed to provide a relatively moderate level of illumination at grade that is sufficient to provide a sense of security to pedestrians as well as sufficient to alert drivers to the presence of roadside hazards in conjunction with the on-board vehicle lighting systems.

Traditionally, each of the luminaires in a lighting network was either individually controlled (e.g., through the use of a photocell) or groups of luminaires were commonly controlled (e.g., power was interrupted to all luminaires in a parking lot at 6:30 A.M.). Such control is inefficient and falls short of current trends in cost minimization and environmental consciousness. The ongoing increase in growth and reduction in cost of wired and wireless communication technology provides a cost effective and energy efficient way of networking luminaires in a lighting system to enable the coordination and cooperative operation of all or a portion of the luminaires forming the lighting system.

In particular, wiredly or wirelessly networking at least a portion of the luminaires in a lighting system provides the ability to adjust, adapt, or control the luminous output of individual luminaires or groups of luminaires autonomously and in real time responsive to external events occurring in the vicinity of one or more luminaires. Such external events may, for example, be sensed using one or more sensors communicably coupled to some or all of the luminaires. The occurrence of such external events can be sensed by a first luminaire and communicated to any number of other luminaires within the network.

Such operational capabilities and efficiency may be enhanced where each of the luminaires in the lighting system is individually addressable. A network of addressable luminaires, each assigned to a specific physical or geographic location permits the system to respond to an external event by adjusting the luminous output of particular luminaires. Such allows, for example, an increase in the luminous output of a first luminaire proximate an elevator or stairway when a second luminaire proximate a parking garage entrance ramp senses the movement of a vehicle on the entrance ramp.

Where a number (or even all) of the luminaires are equipped with sensors, the resultant sensor network is not only able to detect an event (e.g., movement of an object), but also to predict future events and respond by increasing or decreasing illumination levels according to one or more sensed or determined characteristics or parameters of the sensed event (e.g., direction of travel or velocity of the object). In this way, the networked luminaires forming the lighting system are able to act as a cellular automaton where the control of the luminous output of each luminaire (i.e., each "cell" in the cellular automaton) is autonomously adjusted, affected, or controlled based on both rules in the form of logic executed by a controller in the luminaire as well as the state of one or more other luminaires (i.e., the "neighborhood of the cell" in the cellular automaton). In some instances, a common clocking or timing signal may not be present in the luminaire network, in which case, the network may function as an asynchronous cellular automaton.

An illumination system may be summarized as including a luminaire including at least one light source; a controller with defined logic to autonomously operate the at least one light source responsive to a signal indicative of motion; and a communications transceiver communicably coupled to the controller to communicate with at least one other luminaire.

The illumination system may further include at least one sensor communicably coupled to the controller, to detect the occurrence of at least one event external to the luminaire.

The at least one sensor may include at least a motion sensor and the signal indicative of motion may include a signal indicative of motion provided by the motion sensor. The at least one sensor may further include a photosensitive transducer to further provide a signal indicative of an ambient light condition external to the luminaire. The defined logic may further autonomously operate the light source responsive to the signal indicative of the ambient light condition external to the luminaire. The signal indicative of motion may include a signal indicative of motion provided by the at least one other luminaire via the communications transceiver. The controller may further include at least one time-keeping circuit. The controller may identify one of a plurality of luminaires as closest in physical proximity to the luminaire. The controller may autonomously retransmit the signal indicative of motion to the one identified closest luminaire. The luminaire may include one of a plurality of luminaires, the controller in each of the plurality of luminaires having an identifier known to at least one other of the plurality of luminaires. The controller may further selectively autonomously communicate at least one signal via the communications transceiver to at least one selected recipient luminaire, the at least one signal addressed to the at least one selected recipient luminaire using the respective identifier of the at least one selected recipient luminaire identifier. The at least one recipient luminaire may include at least one luminaire identified by the controller as closest in physical proximity to the luminaire. The at least one light source may include at least one solid-state light source.

An illumination system may be summarized as including a luminaire including at least one light source disposed at least partially in a housing; a controller with defined logic to selectively autonomously operate the at least one light source responsive to a signal indicative of motion remote from the luminaire, the signal indicative of motion provided by at least one other luminaire; a communications transceiver communicably coupled to the controller to communicate with the at least one other luminaire; and at least one sensor communicably coupled to the controller and physically coupled to the housing, to detect the occurrence of at least one event external to the luminaire and to selectively autonomously operate the at least one light source responsive to the detection of the at least one event external to the luminaire.

The at least one sensor may include at least one motion sensor to provide a signal indicative of motion proximate the luminaire. The at least one sensor may further include at least one photosensitive transducer to provide a signal indicative of an ambient illumination condition external to the luminaire. The controller may selectively autonomously operate the at least one light source responsive at least in part to the signal indicative of the ambient illumination condition external to the luminaire. The controller may further selectively autonomously operate the at least one light source responsive to the signal indicative of the ambient illumination condition external to the luminaire in the absence of a signal indicative of motion, and may selectively autonomously operate the at least one light source responsive to the signal indicative of motion when the signal indicative of motion is present. The controller may further include a communicably coupled time-keeping circuit and the controller may further selectively autonomously operate the at least one light source in coordination with a determined time of occurrence of an expected solar event including at least one of: an expected sunset event or an expected sunrise event. The defined logic may further autonomously operate the at least one light source in coordination with the determined time of occurrence of an expected solar event in the absence of a signal indicative of motion, and may autonomously operate the at least one light source in coordination with the signal indicative of motion when the signal indicative of motion is present. The signal indicative of motion may include a signal indicative of motion provided by the at least one other luminaire via the communications transceiver. The at least one other luminaire may include at least one of a plurality of luminaires determined by the controller as being closest in physical proximity to the luminaire. The defined logic may cause the controller to further autonomously retransmit the signal indicative of motion to the at least one other luminaire. The luminaire may include one of a plurality of luminaires, the controller in each of the plurality of luminaires having an identifier known to at least one other of the plurality of luminaires. The defined logic may cause the controller to further selectively autonomously communicate the at least one signal via the communications transceiver to at least one selected recipient luminaire, the at least one signal addressed to the at least one selected recipient luminaire using the respective identifier of the at least one selected recipient luminaire. The at least one other luminaire may include at least one of a plurality of luminaires determined by the controller as being closest in physical proximity to the luminaire. The at least one light source may include at least one solid-state light source.

A method of controlling a plurality of luminaires may be summarized as including receiving from another of the plurality of luminaires at a controller via a communicably coupled communications transceiver at least one signal including information indicative of at least one motion-related parameter of an object remote from and external to a luminaire at least partially housing the controller and the communications transceiver; autonomously adjusting by the controller a luminous output of at least one light source in response to the receipt of the information indicative of the at least one motion-related parameter of the object; and autonomously communicating via the communications transceiver communicably coupled to the controller at least one signal including information indicative of at least one of: the at least one motion-related parameter of the object or the luminous output of the luminaire.

Receiving information indicative of the at least one motion-related parameter of the object may include receiving a signal including information indicative of at least one of: a velocity of the object or a direction of motion of the object. Receiving a signal including information indicative of at least one of: a velocity of the object or a direction of motion of the object may include receiving a signal from at least one other of the plurality of luminaires via the communications transceiver communicably coupled to the controller. Receiving a signal including information indicative of at least one of: a velocity of the object or a direction of motion of the object may include receiving a signal including information indicative of at least one of: a velocity of the object or a direction of motion of the object as determined by a single motion sensor. Receiving the signal indicative of at least one of the velocity of the object or the motion of the object may include receiving information provided by at least two of the plurality of luminaires based at least in part on a physical distance between the at least two luminaires and a time required by the object to transit the physical distance between the at least two luminaires. Receiving a signal including information indicative of at least one of: a velocity of the object or a direction of motion of the object may include receiving a signal from at least one motion sensor communicably coupled to the controller and disposed at least partially within the luminaire. Receiving the signal indicative of at least one of the velocity of the object or the motion of the object may include receiving information indicative a change in distance between the at least one motion sensor and the object over a defined time interval.

The method of controlling a plurality of luminaires may further include selectively autonomously adjusting by the controller in each of a number of selected luminaires the luminous output of each of the respective number of the selected luminaires based at least in part on at least one of the velocity of the object or the direction of motion of the object.

The method of controlling a plurality of luminaires may further include selectively autonomously adjusting by the controller in each of the number of selected luminaires a rate of change in the luminous output of each of the respective number of the selected luminaires based at least in part on at least one of the velocity of the object or the direction of motion of the object.

Selectively autonomously adjusting a rate of change in the luminous output of each of the number of the selected luminaires may include adjusting the rate of change in the luminous output of the number of the selected luminaires based on the velocity and the direction of motion of the object. Responsive to receipt of a signal indicating a motion towards the number of selected luminaires, the rate of change in the luminous output of the number of selected luminaires may be adjusted by autonomously increasing the rate at which the luminous output is increased in proportion to the velocity of the object. Responsive to receipt of a signal indicating a motion away from the number of selected luminaires, the rate of change in the luminous output of the number of selected luminaires may be adjusted by autonomously increasing the rate at which the luminous output is decreased in inverse proportion to the velocity of the object. Autonomously communicating at least one signal including information indicative of at least one of: the at least one motion-related parameter of the object or the luminous output of the luminaire may include selectively transmitting at least one signal addressed to at least one selected recipient luminaire. Selectively transmitting at least one signal addressed to at least one selected recipient luminaire may include selectively transmitting at least one signal to a selected recipient luminaire having the closest physical proximity to the luminaire. Selectively transmitting at least one signal addressed to at least one selected recipient luminaire may include selectively transmitting at least one signal to a selected, defined, cell containing a number of recipient luminaires selected from the plurality of luminaires based on at least one of: an identifier assigned to each of the respective selected luminaires or a physical location of each of the respective selected luminaires. Adjusting a luminous output of at least one light source in response to the receipt of the signal including information indicative of the at least one motion-related parameter of the object may include: autonomously increasing the luminous output of the at least one light source upon the receipt of the at least one signal, and autonomously decreasing the luminous output of the at least one light source a defined amount of time after a loss of the at least one signal.

The method of controlling a plurality of luminaires may further include apportioning the plurality of luminaires into a number of cells based on at least one of: an identifier assigned to each of the plurality of luminaires or a physical location of each of the plurality of luminaires, each of the number of cells including at least one luminaire; communicating to each of the luminaires in at least one cell the signal including information indicative of at least one motion-related parameter of an object external to the luminaire; and responsive to the receipt of the signal, adjusting the luminous output of each of the luminaires in the cell.

The method of controlling a plurality of luminaires may further include receiving by the controller at least one signal including information indicative a sensed ambient illumination level external to the at least one luminaire; and adjusting by the controller a luminous output of the at least one light source in response to the receipt of the information indicative of the sensed ambient illumination level.

Receiving by the controller at least one signal including information indicative a sensed ambient illumination level external to the at least one luminaire may include receiving a signal from at least one other of the plurality of luminaires via the communications transceiver. Receiving by the controller at least one signal including information indicative a sensed ambient illumination level external to the at least one luminaire may include receiving a signal from a photosensitive transducer communicably coupled to the controller and disposed at least partially in the luminaire. Adjusting a luminous output of the at least one light source may include adjusting the luminous output of the at least one light source to maintain the ambient illumination level as sensed by the photosensitive transducer in a defined range. The defined range may include the level of illumination provided by at least one other of the plurality of luminaires as measured by photosensitive transducer on the at least one other luminaire and communicated to the controller by the at least one other luminaire.

The method of controlling a plurality of luminaires may further include transmitting a signal including data indicative of the luminous output of the luminaire to at least one other of the plurality of luminaires.

A method of controlling a plurality of luminaires may be summarized as including communicably coupling each of a plurality of luminaires to at least one other of the plurality of luminaires to provide at least one communication path between any two luminaires of all of the plurality of luminaires, where there are at least three luminaires in the plurality of luminaires; receiving at a controller via a communicably coupled communications transceiver at least one signal including information indicative of at least one motion-related parameter of an object external to a luminaire that houses the controller and the communications transceiver; autonomously adjusting by the controller a luminous output of at least one light source in the luminaire in response to the receipt of the information indicative of the at least one motion-related parameter of the object; and autonomously communicating by the controller via the communications transceiver the at least one signal to at least one other recipient luminaire in the plurality of luminaires, the at least one signal including information indicative of at least one of: the at least one motion-related parameter of the object or the luminous output of the luminaire.

Receiving at least one signal including information indicative of at least one motion-related parameter of an object external to a luminaire may include receiving the at least one signal from at least one other luminaire in the plurality of luminaires. Receiving at least one signal including information indicative of at least one motion-related parameter of an object external to a luminaire may include receiving the at least one signal from at least one sensor communicably coupled to the controller where the at least one sensor may not be part of one of the other luminaires. Autonomously communicating the at least one signal to at least one other recipient luminaire in the plurality of luminaires may include selectively autonomously communicating the at least one signal along with data indicative of the identity of the luminaire to the selected recipient luminaire. Autonomously communicating the at least one signal to at least one other recipient luminaire in the plurality of luminaires may further include selectively autonomously communicating the at least one signal along with data indicative of the identity of the luminaire addressed to one or more selected recipient luminaires. Autonomously communicating the at least one signal to at least one other recipient luminaire in the plurality of luminaires may further include selectively autonomously communicating the at least one signal along with data indicative of the identity of the luminaire to a defined cell containing a number of recipient luminaires selected from the plurality of luminaires based on at least one of: an identifier assigned to each of the respective recipient luminaires or a physical location of each of the respective recipient luminaires. Autonomously communicating the at least one signal to at least one other recipient luminaire in the plurality of luminaires may include selectively autonomously communicating the at least one signal including data indicative of the identity of the luminaire to one or more selected recipient luminaires.

The method of controlling a plurality of luminaires may further include determining by the recipient luminaire a velocity of the object based on a spatial distance between the luminaire and the recipient luminaire and an elapsed time between receipt of the at least one signal and detection of the object by the recipient luminaire.

Each of the luminaires in the plurality of luminaires may include at least one time-keeping circuit to temporally synchronize each of the plurality of luminaires. Autonomously communicating the at least one signal to at least one other recipient luminaire in the plurality of luminaires may include selectively autonomously communicating the at least one signal including data indicative of the velocity of the object, data indicative of the identity of the luminaire and data indicative of the time of detection by the luminaire to one or more selected recipient luminaires.

The method of controlling a plurality of luminaires may further include determining by the recipient luminaire an expected time of arrival of the object based on a spatial distance between the luminaire and the recipient luminaire and the velocity of the object.

A method of controlling a plurality of luminaires may be summarized as including apportioning the plurality of luminaires into a number of cells based on at least one of: an identifier assigned to each of the respective luminaires in the plurality of luminaires or a physical location of each of the respective selected luminaires in the plurality of luminaires, each of the number of cells including at least one luminaire; directly or indirectly communicably coupling each of the luminaires within a cell with all other luminaires in the cell; directly communicably coupling at least one bridge luminaire in each cell with at least one other bridge luminaire in a different cell, wherein any one of the plurality of luminaires in a first cell is communicably coupled with any other of the plurality of luminaires in a second cell via the direct communicable coupling between a bridge luminaire in the first cell and a bridge luminaire in the second cell; receiving at a luminaire in a first cell at least one signal including information indicative of at least one motion-related parameter of an object external to the luminaire; autonomously adjusting a luminous output of the luminaire in response to the receipt of the information indicative of the at least one motion-related parameter of the object; and autonomously communicating at least one signal to at least one other recipient luminaire in the plurality of luminaires, the at least one signal including information indicative of at least one of: the at least one motion-related parameter of the object or the luminous output of the luminaire.

The method of controlling a plurality of luminaires may further include adjusting the luminous output of all luminaires in the recipient luminaire cell responsive to receipt of the at least one signal.

The method of controlling a plurality of luminaires may further include retransmitting the at least one signal by the recipient luminaire to a second recipient luminaire in a different cell than the recipient luminaire via the communicable coupling between the respective bridge luminaires in the recipient luminaire cell and the second recipient luminaire cell.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known or well-documented wired and wireless networking protocols such as ZigBee®, Ethernet, power line carrier (PLC), Bluetooth®, IEEE 802.11; well-known or well documented electronic components such as power converters, solid-state lighting systems, and the like; and logical devices such as controllers, motion sensors, photosensitive transducers and the like have either not been shown or shown abstractly and have not described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting," "luminous output" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
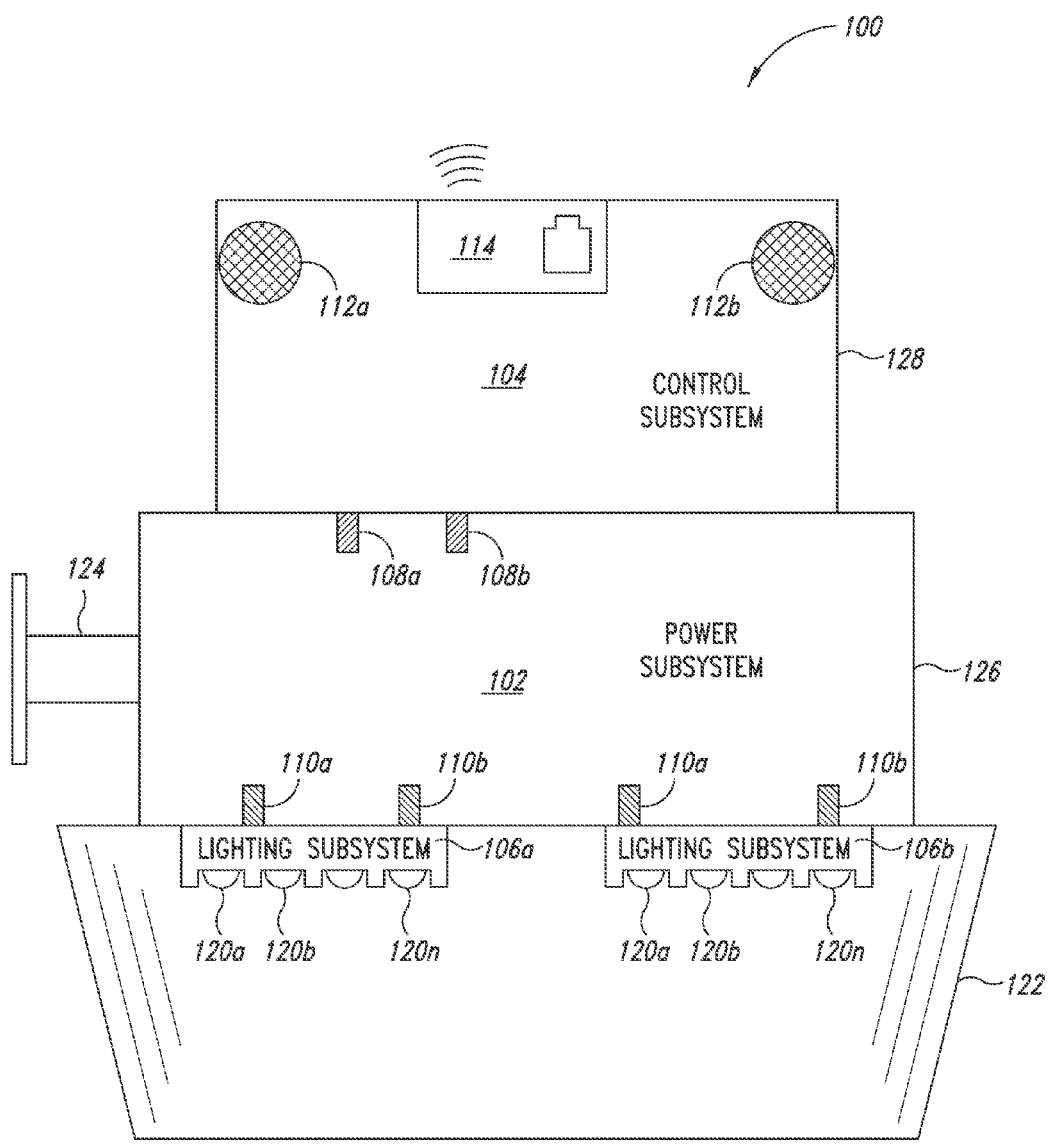
FIG. 1 is a sectional view of a luminaire including a power subsystem, a control subsystem including a communications interface and a number of sensors, and a lighting subsystem including a number of light sources, according to one non-limiting illustrated embodiment.

FIG. 1 shows an illustrative luminaire 100 including a power subsystem 102 communicably coupled to a control subsystem 104 and electrically coupled to one or more lighting subsystems 106a-106b (collectively "lighting subsystems 106") each having any equal or unequal number of light sources 120a-120n (collectively "light sources 120"). The control subsystem 104 may be communicably and electrically coupled to the power subsystem 102 via one or more interfaces 108a-108b (collectively "interfaces 108"). The lighting subsystems 106 may be communicably and electrically coupled to the power subsystem 102 via one or more interfaces 110a-110b (collectively "interfaces 110"). The luminaire 100 can include one or more brackets 124 that permit the support or suspension of the luminaire from a pole, wall, building or similar rigid structure. A transparent, translucent, or opaque shade, diffuser, reflector, or cover 122 may be attached to, and optionally form a portion of, the lighting subsystems 106.

Although depicted as physically coupled for simplicity and ease of discussion, any or all of the power subsystem 102, the control subsystem 104, or the lighting subsystems 106 may be disposed in any configuration including remote from each other. For example, in one instance, the control subsystem 104 may be disposed in an exterior location that is remote from the power subsystem 102 and the lighting subsystem 106 which are disposed in an interior location. In another example, the lighting subsystems 106 may be disposed in an electrically classified area (e.g., a potentially flammable or explosive environment that requires the use of an explosion-proof enclosure) while the power subsystem 102 and the control subsystem 104 may be disposed in an electrically unclassified area (e.g., a non-flammable or explosive environment that does not require the use of an explosion-proof enclosure). In such instances, the power subsystem 102, the control subsystem 104, and the lighting subsystems 106 can be wiredly or wirelessly communicably or electrically coupled.

The luminaire 100 may additionally include wiring (not shown in FIG. 1) to supply power to the power subsystem 102 from an external electrical power source such as an electrical power grid or network. In some instances, the light sources 120 may be formed into a replaceable component, for example a plurality of individual solid state light sources or solid state light source strings formed into a bulb or similar unitary structure in each of the lighting subsystems 106. The lighting subsystems 106 may, in turn, be physically attached and electrically coupled to the power subsystem 102 using a threaded (e.g., an E26 or E40 screw in connector), plug, or bayonet-type interface 110. Alternatively, the light sources 120 may be integral with the power subsystem 102, particularly where the lighting subsystems 106 comprise a number of solid-state light emitters and associated driver circuit hardware which have a relatively long operational life.

The control subsystem 104 includes a number of sensors 112a-112b (collectively "sensors 112"), one or more communications interfaces 114 and one or more electrical devices or systems capable of altering, adjusting or otherwise controlling the power flow to or luminosity, luminous output, or illumination state of the lighting subsystems 106. In at least some instances, the control subsystem 104 can include one or more electrical devices or systems to communicably couple the luminaire 100 to one or more external devices including an external controller or one or more other luminaires 100. The control subsystem 104 may include defined machine executable code, rules, or logic used to alter, adjust or control the operation or luminous output of at least a portion of the lighting subsystems 106. Such machine executable code, rules, or logic may provide for the control of the lighting subsystems 106 in response to the receipt of one or more signals provided by the sensors 112, in response to the receipt of one or more signals provided by another luminaire 100, in response to the receipt of one or more signals provided by an external electronic device, or any combination thereof. In at least some instances, the machine executable code, rules, or logic permit the luminaire 100 to autonomously control the luminous output of some or all of the lighting subsystems 106 responsive to: a condition sensed by at least one of the sensors 112, a condition sensed by another luminaire and communicated to the luminaire 100, or both. In at least some instances, the machine executable code, rules, or logic permit the luminaire 100 to autonomously generate and communicate to other recipient luminaires 100 one or more signals containing data indicative of at least one of a local external event in the vicinity of and sensed by at least one of the sensors 112 or a remote external event communicated to the luminaire 100 by another, communicably coupled, luminaire.

The control subsystem 104 can alter, adjust or control one or more functions of the lighting subsystems 106. Such functions may include, but are not limited to altering, adjusting or controlling the luminous output of the lighting subsystems 106 in response to at least one of: a local external event sensed by at least one of the sensors 112, a remote external event that was sensed by another luminaire and communicated to the luminaire 100, or both. For example, the luminous output of at least a portion of the lighting subsystems 106 may be increased by the control subsystem 104 in response to a sensed decrease in distance between the luminaire 100 and an external object moving towards the luminaire 100. In another example, the luminous output of at least a portion of the lighting subsystems 106 may be decreased by the control subsystem 104 in response to a sensed increase in distance between the luminaire 100 and an external object moving away from the luminaire 100. In another example, the luminous output of at least a portion of the lighting subsystems 106 may be increased by the control subsystem 104 in response to receipt of a signal from another luminaire indicating motion of an external object in a direction towards the luminaire 100. Advantageously, receipt of such a signal permits the autonomous increase in luminous output of the lighting subsystems 106 before the external object is sensed by the sensors 112 on the luminaire 100. The machine executable code, rules, or logic used by the control subsystem 104 thus facilitates the operation of the luminaire 100 in anticipation of the occurrence of one or more future events.

The power subsystem 102 can be disposed at least partially in a housing 126. The housing 126 can include any structure suitable for internally and/or externally accommodating all or a portion of the power subsystem 102. At times, the housing may be a metallic weatherproof enclosure (e.g., a National Electrical Manufacturers Association "NEMA" type 3, 3R, or 4 enclosure) or a corrosion resistant weatherproof enclosure (e.g., a NEMA 4× enclosure). At least a portion of the housing 126 may be substantially transparent to radio frequency (RF) or optical electromagnetic radiation to permit the wireless communicable coupling of the power subsystem 102 with the control subsystem 104. In at least some instances, the interfaces 110 include any current or future developed physical fastener or electrical conductor (e.g., one or more threaded sockets, blade or pin-type bayonets or the like) that can be disposed at least partially on an exterior surface of the housing 126.

The control subsystem 104 can be disposed at least partially in a housing 128. The housing 128 can include any structure suitable for internally and/or externally accommodating all or a portion of the control subsystem 104. At times, the housing may be a metallic weatherproof enclosure (e.g., a National Electrical Manufacturers Association "NEMA" type 3, 3R, or 4 enclosure) or a corrosion resistant weatherproof enclosure (e.g., a NEMA 4× enclosure). At least a portion of the housing 128 may be substantially transparent to radio frequency (RF) or optical electromagnetic radiation to permit the wireless communicable coupling of the control subsystem 104 to the power subsystem 102 and to one or more wireless networks or external wireless electronic devices. In at least some instances, the interfaces 108 coupling the control subsystem 104 to the power subsystem 102 may include any current or future developed physical fastener or electrical conductor (e.g., one or more pads, prongs, spades, protrusions, or similar electrically conductive structures) that can be disposed at least partially on an exterior surface of the housing 128. Such surface mount interfaces 108 are particularly advantageous where the control subsystem 104 is fitted to the power subsystem 102 during manufacture or where the control subsystem 104 is retrofitted to an existing power subsystem 102 after installation. In other instances, the interfaces 108 can include a number of cables, each having a number of conductors linking the power subsystem 102 and the control subsystem 104. Such remote mount devices are particularly useful where the control subsystem 104 is mounted at a distance from the power subsystem 102. In some instances, the interfaces 108 can include a combination of one or more physical fasteners to physically attach the housing 128 to the housing 126 and one or more electrical connectors to communicably couple the control subsystem 104 to the power subsystem 102.

The number of sensors 112 coupled to the control subsystem 104 can include any number or combination of sensors capable of sensing or otherwise detecting the occurrence of one or more external events in the vicinity of the luminaire 100. Such events can include, but are not limited to, events involving one or more objects external to the luminaire 100, events involving the ambient environment about the luminaire 100, or combinations thereof. For example, events involving one or more objects external to the luminaire 100 may include, but are not limited to, the movement of an object in the vicinity of the luminaire, the proximity of an object in the vicinity of the luminaire, or the presence of a combustive or detonative event in the vicinity of the luminaire. In another example, events involving the ambient environment about the luminaire 100 may include, but are not limited to, the ambient illumination about the luminaire, the presence of electromagnetic activity about the luminaire, the presence or absence of one or more defined substances about the luminaire, the presence of high heat levels about the luminaire, the presence of one or more defined biological materials in the environment about the luminaire, the presence of a flammable or explosive environment about the luminaire, the presence of lightning, sudden atmospheric pressure drops or other indicators of severe weather, or the like. The sensors 112 can provide an analog or digital signal output that includes data representative or otherwise indicative of the sensed or detected condition. In some instances, a single sensor 112 may provide an analog or digital signal output that includes data indicative of two or more sensed or detected events or conditions. For example, in some instances, a single sensor 112 may provide an output signal that includes data indicative of distance between the luminaire 100 and an object or motion of an object in the vicinity of the luminaire 100 as well as data indicative of the ambient light level about the luminaire 100.

In at least some instances, the sensors 112 can include a sensor capable of providing a signal output including information indicative of the distance between the sensor and an object in the vicinity of the luminaire 100. Such a signal, when received over a defined time interval allows the control subsystem 104 to determine the direction of travel of the object (e.g. towards or away from the luminaire 100) or the velocity of the object. In other instances, the sensors 112 can include a sensor capable of providing a signal output including information indicative of the motion of an object in the vicinity of the luminaire 100. Such distance or motion sensors 112 can take the form of a passive infrared ("PIR") sensor, an optical sensor, an acoustic sensor, a radio frequency ("RF") sensor, or any future developed sensor technology. In at least some instances, the sensors 112 can include one or more sensors capable of providing a signal output including information indicative of the ambient illumination about the luminaire 100. Such a signal permits the The communications interface 114 coupled to the control subsystem 104 can include any number or wired or wireless interfaces capable of transmitting and receiving one or more analog or digital signals. The communications interface 114 can transmit and receive signals using any current or future defined industry standard or open communications protocols such as IEEE 802.11 ("WiFi"), ZigBee®, Bluetooth®, Near Field Communications ("NFC"), Code Division Multiple Access cellular ("CDMA"), Global System for Mobile Communications cellular ("GSM"), or the like. The communications interface 114 can transmit and receive signals using any current or future defined proprietary or closed communications protocols. The signals transmitted and received via the communications interface 114 can include data indicative of one or more sensed events such as events sensed by the sensors 112, data indicative of one or more expected events such as the expected occurrence of a sunrise or sunset event, data indicative of one or more remote events such as an event sensed by another luminaire, data indicative of one or more operational parameters such as a luminous output level of the luminaire 100, or combinations thereof.

The lighting subsystems 106 can each include any number of light sources 120 capable of providing a luminous output at least in the human visible electromagnetic spectrum. In some instances, some or all of the lighting subsystems 106 may include one or more non-dimmable light sources 120. In other instances, some or all of the lighting subsystems may include one or more dimmable light sources. Some or all of the light sources 120 may take the form of one or more incandescent light bulbs, one or more florescent light bulbs, HID light bulbs or lights, or one or more arc lamps. More preferably, some or all of the light sources 120 may take the form of one or more solid state light sources, for instance an array of light emitting diodes (LEDs), organic light emitting diodes (OLEDs), or polymer light emitting diodes (PLEDs). The one or more light sources 120 do not necessarily have to be enclosed in a bulb structure. For example, the light sources may take the form of one-, two-, or even three-dimensional arrays of individual LEDs or strings of LEDs. Light source configurations other than the individual luminaire shown in FIG. 1 may be used to equal effect. For example, the luminaire may include a plurality of directional lighting subsystems 106 mounted on a common fixture and operated using a single control subsystem 104.

Figure 2:
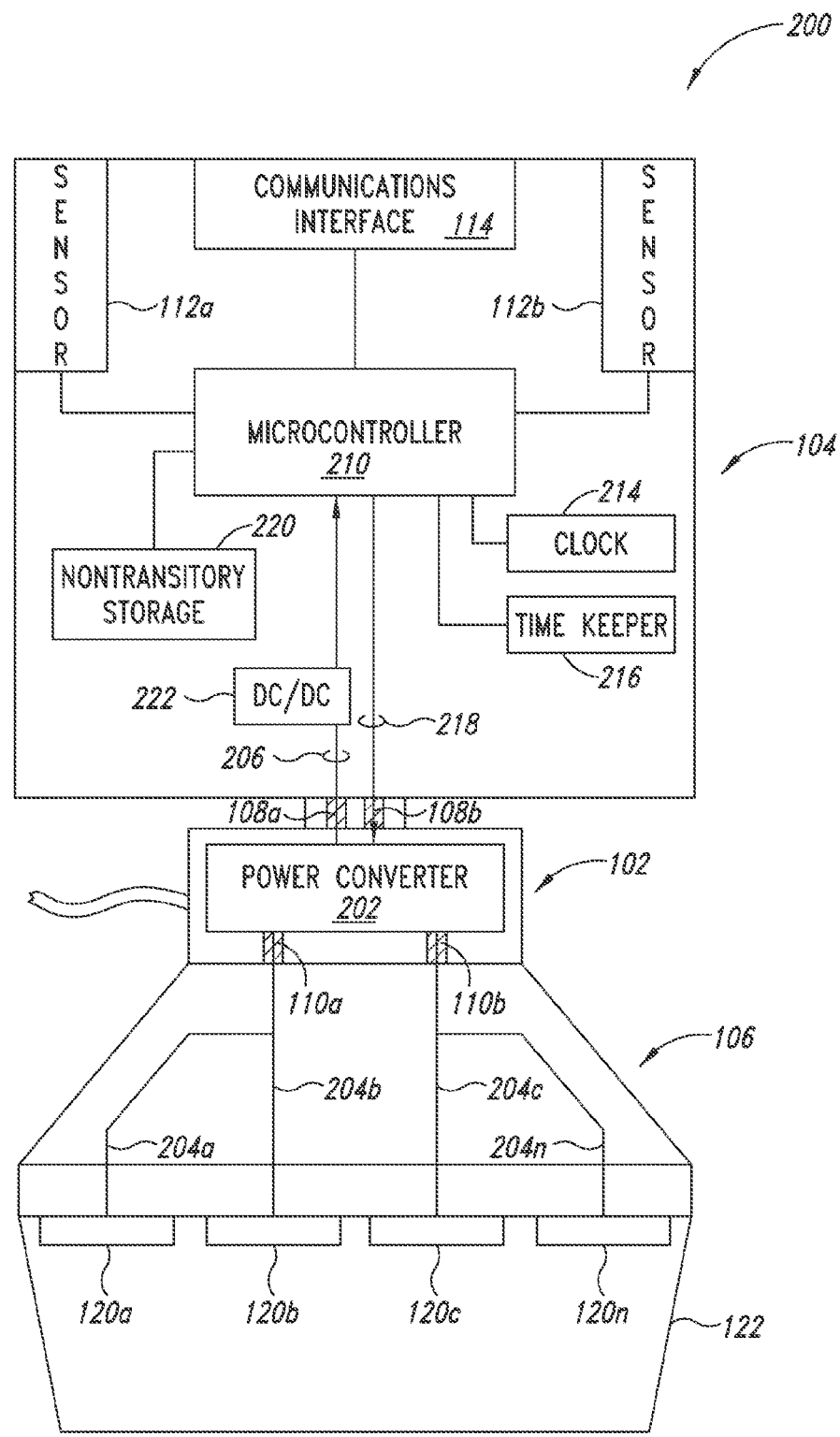
FIG. 2 is a schematic view of luminaire with a power subsystem and a control subsystem including at least one microcontroller, a number of sensors to sense one or more external events in the vicinity of the luminaire and a wired or wireless communications interface, according to one non-limiting illustrated embodiment.

FIG. 2 shows additional details of an illustrative power subsystem 102 and an illustrative control subsystem 104 disposed in a luminaire 200. The luminaire 200 includes the power subsystem 102, the control subsystem 104 and a single lighting subsystem 106 that includes a number of light sources 120a-120n. Power circuits 204a-204n (collectively "power circuits 204") are used to provide electric power from the power subsystem 102 to the light sources 120.

The power subsystem 102 can include one or more devices, systems, or combination of systems and devices (collectively "power converter 202") suitable for converting an incoming power supply to any power output having a waveform and proper voltage and current levels to illuminate all or a portion of the lighting subsystems 106. In at least some instances, the power converter 202 can include a switch-mode power converter such as that described in U.S. Provisional Patent Application Ser. No. 61/723,675, filed Nov. 7, 2012. A switch mode power converter may include one or more rectification sections, one or more high speed switching sections, one or more transformer sections, and one or more output rectification sections. In at least some instances, the switch-mode power converter can include a drive signal controller that provides a variable frequency, variable pulse width, or variable pulse width and frequency pulse width modulated (PWM) drive signal to the high speed switching section. Adjusting either or both the frequency or the pulse width of the PWM drive signal can alter, adjust or control the power delivered by the power converter 202 to the lighting subsystems 106. In at least some instances, the control subsystem 104 can provide one or more control outputs to the drive signal controller to alter, adjust, or control the quantity of power delivered to, and consequently the luminous output of, the lighting subsystems 106.

In other instances, the power subsystem 102 may include a power converter 202 comprising a number of power adapters and driver circuits. In at least some instances, the driver circuits may include one or more mechanical or electromechanical switching devices to interrupt the flow of power to the light source 110. In some instances, the driver circuits can include one or more semiconductor switching devices (e.g., a Mixed Oxide Semiconductor Field Effect Transistor or "MOSFET" of a bipolar junction transistor or "BJT") to alter, adjust or otherwise control the flow of power provided by the power converter 202 to the lighting subsystems 106. In yet other instances, the driver circuits can include one or more pulse width modulated (PWM) switching devices or systems to alter, adjust or otherwise control the flow of power provided by the power converter 202 to the lighting subsystems 106. In at least some instances, the control subsystem 104 can open, close, or otherwise control the operational state of the one or more switches, semiconductor switching devices or similar circuit interrupters.

The power subsystem 102 may be used to provide all or a portion of the power to the lighting subsystems 106. In such instances, a control signal provided by the control subsystem 104 to the power subsystem 102 may be used to selectively alter, adjust, or control the power output or operation of an AC/DC switched mode converter. For example, an IRS2548D SMPS/LED Driver PFC+ Half-Bridge Control IC as manufactured by International Rectifier Corp. (Los Angeles, Calif.) may be used to power some or all of the lighting subsystems 106. In some instances, the power supplied to the lighting subsystems 106 and consequently the luminous output of the light sources 120 in each of the lighting subsystems 106 may be based partially or entirely upon data or information included in the output signal provided by the control subsystem 104 to the power subsystem 102. In such instances, the presence of a low output signal (e.g., a digital "0" signal) from the control subsystem 102 may increase or permit the flow of current to some or all of the solid state light sources 120 while the presence of a high output signal (e.g., a digital "1" signal) from the control subsystem 104 may decrease or inhibit the flow of current to some or all the solid state light sources 120.

As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced.

As used herein and in the claims, adjusting an illumination level also includes increasing and/or decreasing a level of light, luminous intensity or illumination produced. Such may include adjusting an output level for any given discrete light source in one or more lighting subsystems 106. Such may additionally or alternatively include adjusting the state or intensity of a total number of light sources 120 that are in the ON state. For example, a first and second set or strings of light sources 120 may be used to produce a first level of light, luminous output or illumination, while only the first set or string of light sources 120 may be used to produce a second level of light, luminous output or illumination. Also for example, a first number of light sources 120 in a first set or string may be used to produce the first level of light, luminous output or illumination, while a smaller number or subset of light sources 120 in the first set or string may be used to produce the second level of light, luminous output or illumination.

Figure 3:
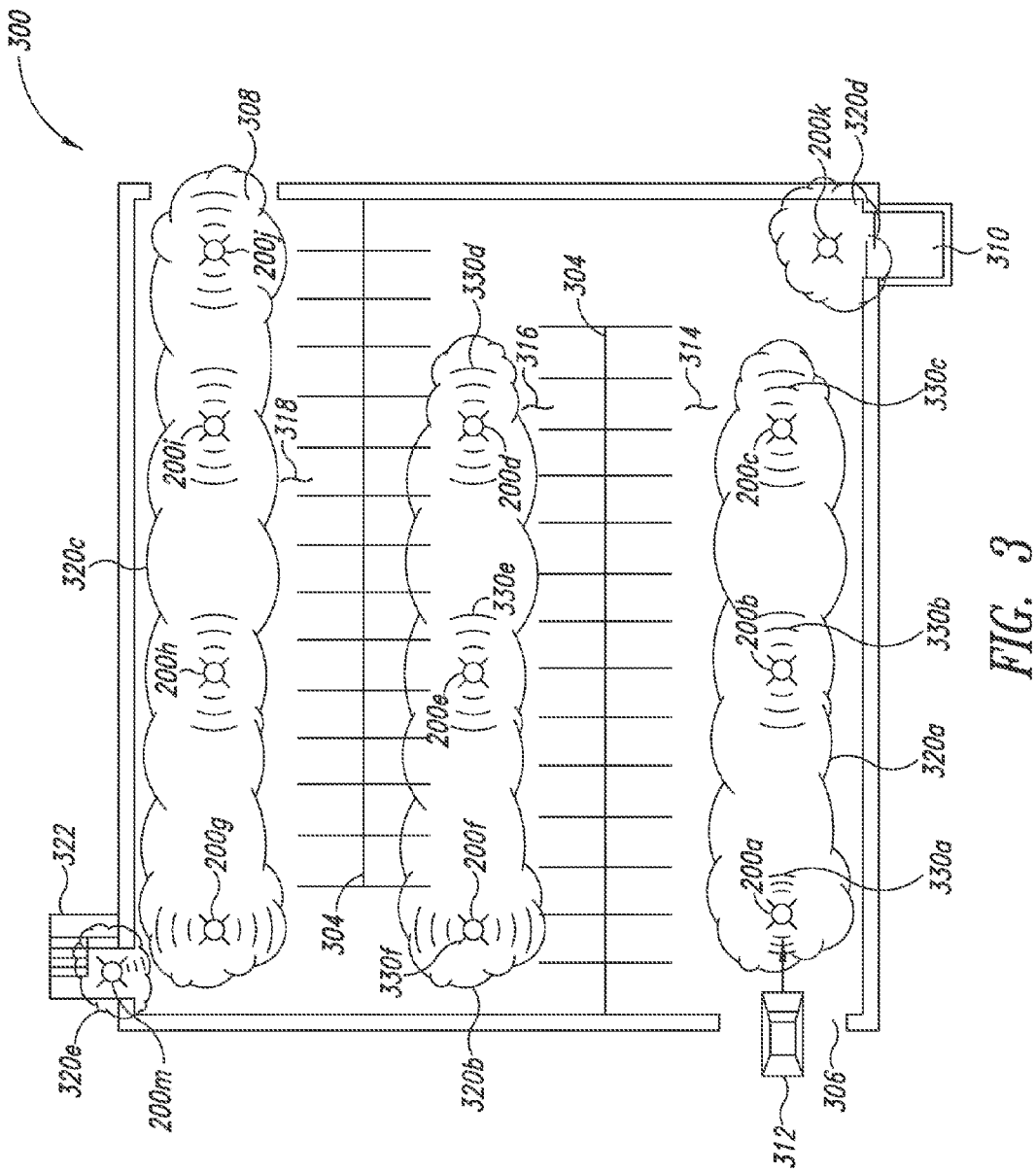
FIG. 3 is a plan view of an illustrative parking lot lighting system comprising a plurality of networked luminaires grouped into a plurality of cells based on an address or a location of the luminaire, according to one non-limiting illustrated embodiment.

The luminaire 200 includes the control subsystem 104 which may be a separate component that can be added post-manufacture, for instance in the form of a retrofit kit, to the luminaire (e.g., by "plugging in" a modular control subsystem 104 to the power subsystem 102 via interfaces 108 as shown in FIG. 3) or may be integral to the luminaire 200 (e.g., a control subsystem 104 that is hardwired to the power subsystem 102 and lighting subsystems 106 as shown in FIG. 2).

Notably, the control subsystem 104 includes at least one microcontroller 210. The control subsystem 104 may also optionally include any number of sensors 112, for example one or more sensors able to detect motion of an object in the vicinity of the luminaire 200 and one or more photosensitive transducer 312 able to sense the varying levels (e.g., power or intensity) of one or more light conditions in the ambient environment external to the luminaire 200. Where provided, the photosensitive transducer 112 may be communicably coupled to the microcontroller 210. In at least some instances, the at least one microcontroller 210 may be used to provide a PWM drive signal 218 to the power converter 202. The microcontroller 210 can alter, adjust or otherwise control one or more aspects or parameters (e.g., pulse width, frequency, or both) of the PWM drive signal 218 to alter, adjust or control the quantity of power transferred from the power converter 202 to the lighting subsystem 104.

The control subsystem 104 may additionally include one or more real time clock ("RTC") circuits 214 or one or more time-keeping circuits 216. Temporal data provided by an RTC circuit 214 or time-keeping circuit 216 may be combined by the microcontroller 210 with data from the sensors 112 to determine one or more additional parameters related to an event external to the luminaire 200. For example, data indicative of a distance between an object external to the luminaire 200 and the luminaire may be provided by a distance or proximity sensor 112 disposed within the luminaire 200. By determining the change in distance between an object and the luminaire 200 over a defined time interval, the direction of travel (e.g., towards or away from the luminaire) and the velocity of the object may be determined. In another example, a signal containing data indicative of the distance between an object and another luminaire may be received over a defined time interval via the communications interface 114 in the luminaire 200. Based on a defined spatial relationship between the two luminaires and the determined direction of travel and velocity of the object, the microcontroller 210 may begin increasing the luminous intensity of the lighting subsystem 106 to achieve a desired luminous output coincident with the determined time of arrival of the object at the luminaire 200.

In other instances, the microcontroller 210 may use temporal data provided by the RTC circuit 214 or the timer circuit 216 to determine via one or more algorithms or via one or more data look-up or retrieval operations the time of occurrence of an expected solar event such as a sunset event or sunrise event. In such instances, the microcontroller 210 may communicate a signal 218 to the power converter 202 that includes data increasing the luminous output of the lighting subsystems 106 from 0% to 100% at a time coordinated with the determined expected time of occurrence of a sunset event. Such a signal 218 may increase either the pulse width or frequency of the PWM drive signal 218 to provide the requested 100% luminous output. The microcontroller 210 may further communicate a subsequent signal 218 to the power converter 202 decreasing the luminous output of the lighting subsystems 106 from 100% to 60% at a specific time (e.g., midnight). Such a subsequent signal 218 may decrease either the pulse width or frequency of the PWM drive signal 218 to provide the requested 60% luminous output.

The machine executable code, rules, or logic executed by the microcontroller 210 may include any number of instruction sets, routines or algorithms useful in controlling one or more aspects of the lighting subsystem 106. For example, in one instance, the machine executable code, rules, or logic executed by the microcontroller 210 may include different routines (e.g., four or more routines) corresponding to a respective number of operating states or modes of the control subsystem 104. In a first operating state or mode, and in the absence of any other signals, the microcontroller 210 may control the luminous output of the lighting subsystem 106 based on a detected or determined ambient lighting condition external to the luminaire 200 (e.g., a control regime providing a dusk to dawn illumination regime in the area of the luminaire). In a second operating state or mode, the first operating state or mode is interrupted when a signal is received from a neighboring luminaire causing an increase in the luminous intensity of the lighting subsystem (e.g., responsive to movement of a remote object detected by the neighboring luminaire). In a third operating state or mode, the first state or mode or the second state or mode is interrupted when at least one of the sensors 112 provides a signal indicative of an external event in the vicinity of the luminaire 200 (e.g., responsive to movement of a nearby object in the vicinity of the luminaire). In a fourth operating state or mode, the first state or mode, the second state or mode, or the third state or mode is interrupted when at least one of the sensors 112 provides a defined alert signal to the microcontroller 210 (e.g., a signal indicating dangerous lightning in the vicinity of the luminaire). Although four illustrative operating states or modes are described above, a greater or lesser number of states or modes may be readily encoded in machine executable code, rules, or logic by one of ordinary skill in the art.

The at least one microcontroller 210 may take any of a variety of forms, for example a microcontroller, programmable gate array (PGA), application specific integrated circuit (ASIC), digital signal processor (DSP), programmable logic controller (PLC) etc. The at least one microcontroller 210 may require very limited computing power, for example an 8-bit microcontroller may be sufficient. The at least one microcontroller 210 may be communicatively coupled to receive signals directly from the sensors 112. In some instances, the at least one microcontroller 210 can include internal nontransitory storage. Advantageously, the defined machine executable code, rules, or logic executed by the microcontroller 210 provides the control subsystem 104 with the ability to autonomously adjust the luminous output of the luminaire 200 responsive to at least one of: one or more events occurring in the vicinity of the luminaire 200 that are detected by the sensors 112; one or more events occurring remote from the luminaire 200 and communicated to the luminaire 200 by neighboring luminaire; one or more operational states of a neighboring luminaire that is communicated to the luminaire 200; or any combination thereof.

In some instances, a single microcontroller 210 may control one or more aspects of the operation of a plurality of wiredly or wirelessly networked luminaires 200. In such instances, the luminaires 200 in the network may be addressed and/or controlled individually, addressed and/or controlled as a plurality of sub-networks, or addressed and/or controlled as a single network. In such an arrangement, the single microcontroller 210 may transmit various signals exercising control over operation of the luminaires 200 comprising the network.

The control subsystem 104 may optionally include nontransitory storage media 220. In at least some instances, at least a portion of the nontransitory storage media 220 may wholly or partially comprise removable storage media such as secure digital (SD) or compact flash (CF) cards, universal serial bus (USB) memory sticks, or similar. The non-removable portion of the nontransitory storage media 220 may take any of a variety of forms, for example electrically erasable programmable read only memory (EEPROM), flash memory, solid state memory, memristor memory, atomic memory, or combinations thereof. The nontransitory storage media 220 may have sufficient capacity to store or otherwise retain the machine executable code, rules, or logic used by the microcontroller 210 in altering, adjusting or controlling one or more parameters of the luminaire 200. In other instances, the nontransitory storage media 220 may further include one or more algorithms to calculate power consumption for the power converter 202 in the power subsystem 102. For example, one or more algorithms to calculate the power consumption of the power converter 202 based on PWM drive signal pulse width or frequency. In some instances, the nontransitory storage media 220 may store one or more algorithms useful in calculating one or more solar events. For example, the nontransitory storage media may store data indicative of the actual or intended operating geolocation for use by the microcontroller 210 in determining the time of occurrence of an expected solar event such as a sunset event or a sunrise event.

In at least some instances, the at least one nontransitory storage media 220 can store or otherwise retain a number of look-up tables or other comparable data structures. In at least some instances such tables may be retained or otherwise stored at least in part on removable, replaceable, or reprogrammable nontransitory storage media. Such look-up tables or data structures may contain power consumption data for the power converter 202 communicably coupled to the control subsystem 104. Such look-up tables or data structures may include location data or address data for a number of neighboring luminaires 200. Such look-up tables or data structures may contain astronomical data such as sunrise times and sunset times for the physical or geographic location at which the luminaire 200 is installed or intended for installation. In at least some instances, all or a portion of the determined power consumption, determined astronomical data, or combinations thereof may be broadcast communicated via the communications interface 114 to any number of neighboring luminaires. In at least some instances, all or a portion of the determined power consumption, determined astronomical data, or combinations thereof may be communicated via the communications interface 114 to one or more specific neighboring luminaires via one or more addressed signals.

In some instances, the at least one nontransitory storage media 220 can store or otherwise retain a number of look-up tables or other comparable data structures related to astronomical or solar event data. Such astronomical or solar event data may include sunrise and sunset times, dusk and dawn times, solar noon and solar midnight times, and the like. In at least some instances, the at least one nontransitory storage media 220 can store or contain geolocation information specific to the position or location or the intended position or location of the luminaire 200 on the surface of the Earth. Such geolocation data can include at least the latitude or other similar positioning information or coordinates sufficient to identify the location or intended location of the luminaire 200 with respect to a pole or the equator or any similar fixed geographic reference point on the surface of the Earth. In some implementations the geolocation data may include the longitude in addition to the latitude. Longitude data may be useful, for example in identifying a particular time zone (e.g., a time zone location referenced to a reference time or time zone such as coordinated universal time, UTC) in which the luminaire 200 is operating or programmed to operate. In some instances, dates and times corresponding to the conversion from daylight savings time to standard time (and vice-versa) may be stored within the nontransitory storage media 220 to permit the scheduled operation of the luminaire 200 to reflect such legislative time changes. Such geolocation, reference time, time zone, and daylight savings time data may be communicated to and stored in the nontransitory storage media 220, for example, using a portable handheld electronic device having global positioning capabilities and a communications link (wired or wireless, including RF, microwave or optical such as infrared) to the luminaire 200. Alternatively, geolocation, reference time, time zone, or daylight savings time information may be stored in a read-only portion of the at least one nontransitory storage media 220, for example when the luminaire 200 is manufactured, installed, commissioned, programmed or serviced.

In some instances, the nontransitory storage media 220 may further store or otherwise retain data representative of one or more other defined thresholds related to one or more sensed events. For example, one or more defined thresholds related to events external to the luminaire 200 such as events occurring in the external environment of the luminaire 200 and detected by the sensors 112. In some instances, data representative of one or more defined thresholds indicating varying levels of electromagnetic pulse strength, electromagnetic pulse distance, or other electromagnetic characteristics associated with atmospheric electrical activity may be stored in the nontransitory storage media 220. In other instances, data representative of one or more defined thresholds indicating varying levels of optical signal strength, optical signal distance, or other optical characteristics associated with atmospheric electrical activity may be stored in the nontransitory storage media 220. In yet other instances, data representative of one or more defined thresholds indicating varying levels of acoustic signal strength, acoustic signal distance, or other acoustic characteristics associated with atmospheric electrical activity may be stored in the nontransitory storage media 220.

In at least some instances, data indicative of one or more alarm, alert or warning thresholds may be stored or otherwise retained in the nontransitory storage media 220. Such alarm, alert or warning thresholds may indicate an unexpected variance in the operation of the luminaire 200 based on one or more signals provided by the sensors 112, an unexpected variance in the operation of the luminaire based on a signal from a neighboring luminaire, or the like.

The control subsystem 104 may include one or more integrated or discrete real time clock circuits 214. For example, a real time clock implemented on integrated circuit such as the PCF2129A as manufactured by NXP Semiconductors (Eindhoven, The Netherlands) may be used in some instances. In at least some instances, the real time clock circuit 314 may be persistently powered, for example using one or more batteries, capacitors, ultracapacitors or similar energy storage devices. Other commercially available semiconductor chips providing real time clock functionality may be equally employed. The control subsystem 104 may implement a real time clock based on timing signals produced by the microcontroller 210, processor clock, or another oscillator. The control subsystem 104 may optionally include a timer circuit 216 (e.g., a digital timing circuit or an analog timer circuit). In at least some instances, the timer circuit 216 may be persistently powered, for example using one or more batteries, capacitors, ultracapacitors or similar energy storage devices. The timer circuit 216 may produce control signals at defined periods following an occurrence of defined times as indicated by the real-time clock circuit 214 of the control subsystem 104.

The control subsystem 104 may include an optional power converter 222 that rectifies, steps down a voltage or otherwise conditions electrical power supplied to the at least one microcontroller 210, the nontransitory storage media 220 and/or other components of the control subsystem 104. In one instance, the power converter 222 may include an AC/DC converter used to step a voltage down to a first level suitable for the control electronics of the control subsystem 104. An example of such an AC/DC converter is a "capacitor dropping" type AC/DC converter including a moderately sized capacitor (e.g., 1 microfarad capacitor) and a rectifier or bridge rectifier including a capacitor and a half- or full-bridge rectifier.

Although not shown in FIG. 2, the control subsystem 104 can include one or more energy storage devices (e.g., battery cells, button cells, capacitors, super- or ultracapacitors, fuel cell), used to supply power to the components of the control subsystem 104 when needed, for example in the event of loss of power from the grid or other external power source. For example, the one or more energy storage devices may supply power to the real time clock circuit 214 or the timer circuit 216 in instances where electrical power supplied by an electrical distribution grid or network is interrupted. The one or more energy storage devices may also provide sufficient power to maintain the current date, day in the solar cycle, or Julian date and the current time within the real time clock circuit 214 during the luminaire manufacturing, shipping and installation process. In at least some instances, the current time can include a local time (i.e. the time in the time zone in which the luminaire is operating or intended to operate) or a universal time such as coordinated universal time (UTC). Where a universal time is used, one or more correction factors useful in converting the universal time to a local time in which the luminaire is operating or intended to operate may be stored in the nontransitory storage media 220.

In some instances, the current time and current date may be the local time and the local date at the geographic location where the luminaire is installed or is intended for installation. Such local time and local date information may be stored within the nontransitory storage media 220 along with any local time changes (e.g., Daylight Savings time changeover dates and times), leap years, or other events affecting the local time or local date. Such current time/current date or local time/local date information may be periodically or continuously provided to or updated in the luminaire using one or more external electronic devices. For example, the current or local time or date may be periodically updated using an electronic device connected via a wired or wireless network, or a portable electronic device such as a cellular telephone, portable data assistant, tablet computer, or the like.

Each luminaire 200 is able to autonomously control the operation of the lighting subsystems 106 using the sensors 112 and based on the machine executable code, rules, or logic executed by the microcontroller 210. Such control allows each luminaire 200 to autonomously alter, adjust or control the luminous output of the lighting subsystems 106 responsive to one or more expected, sensed or detected external events occurring in the vicinity of the luminaire 200. Advantageously, where a number of communicably coupled, networked, luminaires 200 are disposed in an area, each of the luminaires 200 is able to communicate one or more signals that include data indicative of one or more events external to the luminaire as well as data indicative of the response (if any) taken by the luminaire 200 to the external event. The communication of signals including such data to some or all of the networked luminaires or a number of the neighboring luminaires provide the ability for the networked or neighboring luminaires to alter, adjust or control the luminous output of their respective lighting subsystems 106 responsive both the received signal and to an expected, sensed or detected external event occurring in the vicinity of the respective luminaire 200.

In at least some instances, each of the communicably coupled, networked, luminaires 200 may be individually addressable to permit directed or targeted (e.g., via a unicast or multicast transmission) rather than broadcast transmission of one or more signals between some but perhaps not all of the luminaires 200 in the network. Such addressing may, for example, be in the form of data including one or more unique identifiers disposed in the microcontroller 210 or the nontransitory storage media 220. In some instances, the address associated with a particular luminaire 200 can be immutable, permanently stored or "burned" in a nontransitory, non-volatile storage location within the control subsystem 104 (e.g., a write once, read many or "WORM" storage location). In other instances, the address associated with a particular luminaire may be changed or rewritten. Such may provide the ability to use an easily understandable addressing scheme (e.g., addresses such as "floor 2 elevator," "north entrance," and "south entrance" are more easily understood than an arbitrary character string assigned by the manufacturer or supplier at the point of manufacture or assembly of the luminaire 200).

In at least some instances, each of the communicably coupled, networked, luminaires 200 may be placed in a particular physical location. Examples include, but are not limited to, any number of luminaires placed along a roadway, a sidewalk, a parking lot, a parking garage, an industrial facility, or the like. In at least some instances, a particular luminaire 200 may be associated with a particular geographic location. Where a particular luminaire 200 has a unique address, the address itself may also be associated with the physical or geographic location of the luminaire 200. In some instances, geographic location data may be autonomously stored in the control subsystem 104, for example using an on-board geolocation system such as a global positioning system ("GPS") receiver or a cellular triangulation system. In some instances, an external geolocation system, for example a GPS receiver in a portable handheld device may be used to transmit geolocation data to the control subsystem 104 via the communications interface 114. In yet other instances, the physical or geographic location data may be stored in the control subsystem 104 at the time of manufacture, assembly, shipment, installation or configuration of the luminaire 200.

The physical or geographic location data for some or all of the networked luminaires 200 may be shared among the luminaires 200 such that each luminaire 200 can access data including information indicative of the address and location of at least one neighboring luminaire 200. In some instances, each luminaire can access data including information indicative of the address and location of at least one "nearest neighbor" luminaire. In other instances, each luminaire 200 can access data including information indicative of the address and location of some or all of the communicably coupled, networked, luminaires 200.

In some instances, the address and location data for a new luminaire joining the network may be autonomously propagated across the network, for example via one or more broadcast signals or via one or more retransmitted targeted signals generated by the new luminaire when the new luminaire joins to the network. In other instances, the address and location for a new luminaire joining the network may be manually propagated across the network, for example via one or more manually generated broadcast signals or via one or more manually generated retransmitted targeted signals (e.g., a unicast or multicast signal) generated by the new luminaire when the new luminaire joins to the network. Such addressing and location data may be individually stored in the control subsystem 104 in each luminaire 200 or may be stored in one or more locations accessible via the network to all of the communicably coupled luminaires.

The ability to individually address particular luminaires 200 provides each luminaire 200 in the network with the ability to autonomously adjust one or more operating parameters responsive to the occurrence of an external event in the vicinity of the luminaire as well as responsive to the receipt of a signal transmitted by another luminaire in the network. Such autonomous adjustment capability in each luminaire 200 is provided by the machine executable code, rules, or logic executed by the microcontroller 210. By providing each luminaire 200 in the network with the ability to act and respond autonomously, a cellular automaton is created. Within the cellular automaton, an operating parameter of each luminaire (e.g., the luminous output) is determined by the luminaire itself (e.g., in response to a signal provided by the sensors 112 and the machine executable code, rules, or logic and the operating state or mode of the control subsystem of the respective luminaire) and by one or more operating parameters of other luminaires within the network. Such an arrangement advantageously permits the ability for the microcontroller 210 to autonomously alter, adjust or control an operating parameter of a first luminaire 200 in the network (e.g., increasing the luminous output of a luminaire positioned at the front door of a commercial building) based on at least one of: signal(s) received from the sensors 112 in the first luminaire 200 (e.g., a signal indicative of motion in the vicinity of the front door), signal(s) received from one or more second luminaires within the network (e.g., a signal indicative of motion sensed by a second luminaire positioned along a driveway leading to the front door), based on a current operating state or mode of the luminaire itself, or any combination thereof.

In some instances, the communicably coupled, networked, luminaires 200 may be apportioned into a number of logically grouped cells, each cell containing at least one luminaire 200. Within a particular cell, each of the constituent luminaires may selectively operated by the control subsystem 104 either autonomously or in conjunction with the operation of one or more other constituent luminaires in the same cell according to one or more defined operating schemes. Luminaires may be grouped within a particular cell using one or more criteria. Example criteria include, but are not limited to, data indicative of the physical location of the luminaire, data indicative of the geographic location of the luminaire, data indicative of the address of the luminaire, or any combination thereof.

Such cellular operating schemes may advantageously permit the autonomous alteration, adjustment, or control of one or more operating parameters of all of the luminaires in the cell upon detection of an external event by at least one of: a constituent luminaire in the cell, a non-constituent luminaire external to the cell, or both. For example, a number of luminaires in a stairwell of a multi-level parking garage may be logically grouped into a single cell such that when any one of the luminaires in the cell detects motion (e.g., motion of a person in the stairwell), the luminous output of all of the luminaires in the cell (i.e., all of the luminaires in the stairwell) are increased to brightly illuminate the stairwell.

As explained in detail below with reference to FIGS. 3-5, the at least one microcontroller 210 can be used to perform multiple functions within each of the communicably coupled, networked, luminaires 200. For example, machine executable code, rules, or logic can cause the at least one microcontroller 210 can to control the luminous output of the lighting subsystems 106 in a defined manner responsive to sensed local external conditions such as ambient illumination levels, atmospheric events, and the presence or movement of an object in the vicinity of the luminaire 200. Such machine executable code, rules, or logic can also cause the at least one microcontroller 210 to control the luminous output of the lighting subsystems 106 in a defined manner responsive to remote external conditions such as ambient illumination levels, atmospheric events, and the presence or movement of an object that are sensed by another communicably coupled, networked, neighboring luminaire and communicated either directly to the luminaire 200 or to a luminaire cell of which the luminaire 200 is a member. Such events may or may not be within the local environment, and hence sensible, by the sensors 112 on the luminaire 200.

In at least some instances, the microcontroller 210 can also advantageously monitor the power consumed by the power subsystem 102 to power the lighting subsystem 104. Thus, the microcontroller 210 is in a unique position to establish, alter, adjust or control a desired luminous output of the lighting subsystem 104 and to monitor the power consumption of the power subsystem 102 to confirm that the power consumption at any given luminous output level falls within a defined range of acceptability. Such also allows the creation of alarms, alerts, or similar notifications communicable to one or more remote monitoring devices or stations via the communications interface 114 when the measured power consumption of the power subsystem 102 deviates from or falls outside a defined range of acceptability based on the luminous output of the lighting subsystems 106. In operation, the microcontroller 210 provides at least one signal 136 to the converter drive controller 128. Responsive to the receipt of the signal 136 from the control subsystem 104, the converter drive controller 128 alters one or more parameters of the PWM drive signal 130 provided to the switching section 118 of the switch-mode power converter 102 to achieve the desired power output and consequently the desired luminous output from the luminaire 300.

FIG. 3 shows a first level parking garage 300 with eleven (11) communicably coupled luminaires 200a-200m (collectively "luminaires 200") grouped into five (5) luminaire cells 320a-320e (collectively "luminaire cells 320"). The parking lot 302 is divided into parking stalls 304, an entrance 306, an exit 308 an elevator 310, pathway portions 314, 316, 318, and a stairway 322. An automobile 312 is shown entering the parking lot 302 via the entrance 306. Each of the luminaires 200 is equipped with a control subsystem 104 comprising at least a motion sensor 112, a communications interface 114 and a microcontroller 210. Luminaires 200a-200c are positioned above pathway 314, luminaires 200d-200f are positioned above pathway 316, and luminaires 200g-200j are positioned above pathway 318. Luminaire 200k, the sole member of luminaire cell 320d, is positioned proximate the elevator 310 and luminaire 200m, the sole member of luminaire cell 320e, is positioned proximate the stairway 322.

For clarity and ease of discussion, in the following description of FIG. 3, the various components and subsystems in each of the luminaires 200 will be followed by an alphabetic suffix when the component or subsystem is referenced to a single luminaire. For example, the power subsystem, control subsystem, and lighting subsystems of luminaire 200a will be referred to as power subsystem 102a, control subsystem 104a, and lighting subsystems 106a. A reference without an alphabetic suffix should be understood to refer to more than one such component or subsystem.

Each of the luminaires 200 can include a nontransitory storage media 220 that includes address and location data for some or all of the other luminaires 200. For example, in some instances the nontransitory storage media 220a in luminaire 200a may include the address and physical or geographic location data for all other luminaires 200b-200k. In other instances, the nontransitory storage media 220a in luminaire 200a may include address and physical or geographic location data for a number of defined, selected, luminaires such as the nearest neighbor luminaire 200b and the elevator luminaire 200k. Such address and physical or geographic location data may be manually stored in the nontransitory storage 220a during manufacture, assembly, installation or configuration or may be autonomously acquired by and stored in the control subsystem 104 in luminaire 200a subsequent to installation. In parking lot 300, the luminaires 200 have been grouped into three luminaire cells 320a, 320b, 320c corresponding respectively to each of the three pathways 314, 316, 318 in the parking garage. A fourth cell 320d includes only luminaire 200k.

Prior to entry of the automobile 312 into the parking garage 300, the luminaires 200 may be in an energy saving mode where the luminous output of each is at some level less than 100% of their rated or nominal output, for example each of the luminaires 200 may be at a luminous output of 50% of their rated or nominal output. As the automobile 312 proceeds into the parking garage 300 the motion sensor 112 in luminaire 200a detects the motion of the automobile towards the luminaire 200a. In response to detecting the motion of the automobile 200a, the control subsystem 104a can increase the luminous output of the lighting subsystem 106a from 50% to 100%. Coincidental with the increase in luminous output, the control subsystem 104a can generate one or more signal outputs to some or all of the luminaires 200b-200k. In some instances, such a signal output may include a broadcast signal to all of the remaining luminaires 200b-200k. In other instances, such a signal output may include a targeted signal (i.e., a unicast or multicast signal) to one or more neighboring luminaires, for example luminaire 200b as the "nearest neighbor" or luminaires 200b and 200c as constituents of the same luminaire cell. Other luminaires may also receive the targeted signal. The signal output 330a can include data indicative of detection of a moving object, as well as, of one or more of: the direction of motion of the object, the velocity of the object, other external event parameters, the luminous output of the lighting subsystems 102a, other luminaire 200a operating parameters, or combinations thereof. Upon receipt by one or more remaining luminaires 200b-200k, the machine executable code, rules, or logic in each of the remaining luminaires 200b-200k may or may not cause the control subsystem 104b-104k to adjust the luminous output of the respective lighting subsystems 106b-106k.

For example, responsive to the detection of the direction of motion of the automobile 312 as sensed by the sensors 112a and communicated via the output signal 330a, the luminous output of other luminaires 200b, 200c in luminaire cell 320a may increase to better illuminate the driveway 314 where the automobile 312 will travel. Responsive to the detection of the velocity of the automobile as sensed by the sensors 112a and communicated via the output signal 330a, the rate of increase in the luminous output of the other luminaires 200b, 200c in luminaire cell 320a may be adjusted to better illuminate the driveway 314 before the automobile 312 arrives at the location of luminaires 200b, 200c. In some instances, the luminous output of luminaire 200a may be related to the detected velocity of the automobile 312 (e.g., a higher sensed automobile velocity may cause a higher luminous output from lighting subsystems 106a). In such instances, rather than transmit an output signal 330a including data indicative of the velocity of the automobile 312, the control subsystem 104a may instead transmit an output signal 330a including data indicative of the luminous output of the lighting subsystems 106a such that the lighting subsystems 106b, 106c can assume a similar luminous output level. Importantly, the recipient luminaires 200b-200k have no direct indication of the presence, motion, direction of motion, or velocity of the automobile 312, yet each may change their respective luminous output based on data contained in the output signal 330a provided by luminaire 200a which does have a direct indication of the motion of the automobile 312.

In another example, prior to detecting any motion within the garage 300, the luminaires 200 may be in an energy saving mode where the luminous output of each is at some level less than 100% of their rated or nominal output, for example each of the luminaires 200 may be at a luminous output of 50% of their rated or nominal output. Upon detection by the motion sensor 112a of motion having one or more characteristics (e.g., speed, infrared profile, size, etc.) corresponding to pedestrian foot traffic proximate the luminaire 200a, the control subsystem 104a can increase the luminous output of luminaire 200a from 50% to 100% of rated or nominal output. Coincidental with the increase in luminous output, the control subsystem 104a can generate one or more signal outputs to some or all of the luminaires 200b-200k. Responsive to the receipt of the signal from luminaire 200a indicative of pedestrian traffic within the garage 300, all of the luminaires 200b-200k may increase their respective luminous output to 75% of rated or nominal output to provide a uniform level of illumination throughout the garage 300. Such a uniform level of illumination may be desirable since pedestrians may not be limited to travel along pathways 314, 316, and 318 (e.g., pedestrians can "short cut" between cars). As other luminaires 200b-200k within the garage 300 detect proximate pedestrian traffic (or motion associated therewith), their respective luminous output may be increased from 75% to 100% of rated or nominal output. Thus, in at least some instances, different machine executable code, rules, or logic may be autonomously executed the controllers 104 in each of the in each of the remaining luminaires 200b-200k dependent on the detection of either vehicular or pedestrian traffic within the garage 300 by any one of the luminaires 200a-200k.

An example machine executable code, rules, or logic used by the microcontrollers 210 in each of the luminaires 200a-200j may include the following:

1. Where the ambient light level as sensed by a photosensitive transducer 112b is less than a defined threshold (e.g., 10 foot-candles) and motion sensor 112a detects motion, increase the luminous output of the lighting subsystems 106 (e.g., increase luminous output of the lighting subsystems in the luminaire sensing the motion from 40% to 100% of rated output).
2. If sensed ambient light levels are greater than 10 foot-candles do not activate the luminaire responsive to motion (luminaire may still be illuminated for other critical purposes, for example to alert of nearby atmospheric electrical activity).
3. If an output signal including data indicative of detected motion is received from a remote luminaire, increase the luminous output of the lighting subsystems 106 (e.g., increase luminous output of the lighting subsystems in the recipient luminaire from 40% to 70% of rated output).
4. If an output signal including data indicative of detected motion is received from a nearest neighbor luminaire, increase the luminous output of the lighting subsystems 106 (e.g., increase luminous output of the lighting subsystems in the recipient luminaire 200 from 40% to 100% of rated output).
5. If motion is detected using motion sensor 112a, transmit an output signal including data indicative of the sensed motion via the communications interface 114 and begin measuring elapsed time using an RTC circuit 214 or a timer circuit 216.

6. If luminous output is above a defined threshold (e.g., 40%), no motion is detected by the motion sensor 112a, no output signals indicative of motion are received from a remote luminaire or a nearest neighbor luminaire, and the elapsed time exceeds a defined threshold (e.g., 30, 45, 60 seconds, etc.) then reduce luminous output of the lighting subsystems 106 (e.g., reduce luminous output of the lighting subsystems 106 to the defined threshold or less).
7. If luminous output is above a defined threshold (e.g., 40% of rated output), no motion is detected by the motion sensor 112a, no output signals indicative of motion are received from a remote luminaire or a nearest neighbor luminaire, the elapsed time exceeds a defined threshold (e.g., 30, 45, 60 seconds, etc.), and the time of day as measured by an RTC circuit 214 is within a defined range (e.g., 18:00 and 07:00) then reduce luminous output of the lighting subsystems 106 (e.g., reduce luminous output of the lighting subsystems 106 to 0% of rated output).
8. If the time of day as measured by an RTC circuit 214 is within a defined range (e.g., 07:00 and 18:00) and the ambient light level as sensed by a photosensitive transducer 112b is less than a defined threshold (e.g., 10 foot-candles), increase the luminous output of the lighting subsystems 106 to an intermediate level (e.g., increase luminous output of the lighting subsystems 106 in the luminaire to 60% of rated output).

Although the machine executable code, rules, or logic are described above in a limited manner for clarity and conciseness, one can appreciate the advantages and flexibility afforded by the microcontroller 210. For example, machine executable code, rules, or logic for specialized situations (e.g., weekends, holidays, special events, etc.) can be developed and stored within the control subsystem 104 for execution on the microcontroller 210.

The machine executable code, rules, or logic executed by the control subsystem 104 may be the same or different for each of the luminaires 200. For example, detection of motion by luminaire 200a may cause an increase in luminous output of luminaires 200b and 200c, while detection of motion of an automobile 312 or an individual (not shown) by luminaire 200c may cause an increase in luminous output of luminaires 200d-200f. For safety, the machine executable code, rules, or logic in the stairway luminaire 200m may cause the microcontroller 210 to maintain the lighting subsystems 106 in the stairway luminaire 200m at a 100% of rated or nominal luminous output level at all times. All or a portion of the machine executable code, rules, or logic may be common to or shared by some or all of the luminaires 200. For example, sensed motion of an automobile 312 or an individual (not shown) transiting the parking garage 300 by any of the luminaires 200 within the garage may result in an increase of the luminous output of the elevator luminaire 200k such that the area in the vicinity of the elevator 310 is brightly illuminated for safe pedestrian ingress and egress.

An example machine executable code, rules, or logic used to control the operation of the elevator luminaire 200k may include the following:
1. If any luminaire 200 or luminaire cell 320 on the same floor of the parking garage 300 is active, then increase the luminous output of the lighting subsystems 106 in luminaire 200k.
2. If no luminaire 200 or luminaire cell 320 on the same floor of the parking garage 300 is active and motion of the elevator door has been detected by the motion sensor in luminaire 200k, then reduce the luminous output of the lighting subsystem 106 in luminaire 200k.
3. If no luminaire 200 or luminaire cell 320 on the same floor of the parking garage is active and motion of the elevator door has not been detected by the motion sensor in luminaire 200k, then maintain the luminous output of the lighting subsystems 106 in luminaire 200k at the increased level.
4. If time of day is within a defined range and no luminaire 200 or luminaire cell 320 on the same floor of the parking garage 300 is active, then decrease the luminous output of the lighting subsystems 106 in luminaire 200k.

Figure 4:
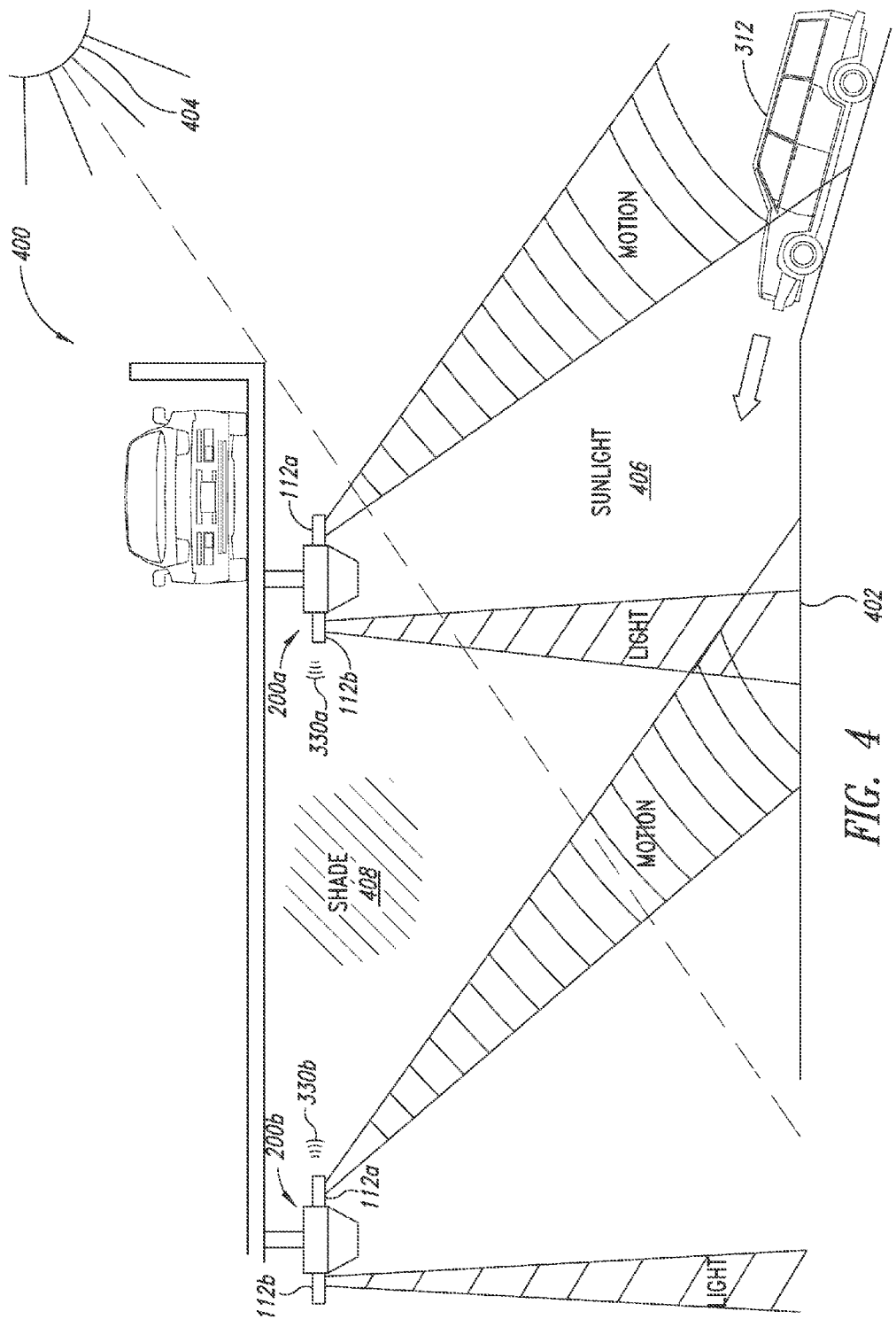
FIG. 4 is an elevation view of an illustrative parking garage lighting system comprising a plurality of networked luminaires each including at least an ambient light sensor and a motion sensor, according to one non-limiting illustrated embodiment.

FIG. 4 shows a multi-level parking garage 400 with two (2) communicably coupled luminaires 200a-200b (collectively "luminaires 200"). An automobile 312 is shown entering the parking garage 400. Each of the luminaires 200 is equipped with a control subsystem 104 comprising at least a motion sensor 112a, a photosensitive transducer 112b, a communications interface 114 and a microcontroller 210. Luminaires 200a, 200b are positioned near the entrance where automobiles 312 enter the parking garage 400. Luminaire 200a is positioned closer to the entrance of the parking garage 400. The sun 404 illuminates a portion 406 of the entrance of the parking garage 400, and casting a shadow 408 in the remaining portion of the parking garage 400.

For at least a portion of the day, the photosensitive transducer 112b in luminaire 200a falls within the brightly illuminated portion 406 of the parking garage 400. In such instances, due to the high level of ambient light, the luminous output of luminaire 200a may be adjusted downward to 20-30% of rated or nominal output, or may even be adjusted to 0% of rated or nominal output to conserve energy. On the other hand, the photosensitive transducer 112b in luminaire 200b falls within a portion of the parking garage 400 that is shaded from the sun 404. In such instances, due to the relatively lower level of ambient light in the shaded portion 408 of the parking garage 400, the luminous output of luminaire 200b may be greater than the luminous output of luminaire 200a commensurate with the degree of illumination in the parking garage 400.

In some instances, energy conservation measures or economic considerations may favor an overall reduction in the power consumed by area lighting such as that provided by luminaires 200a and 200b during periods of high ambient illumination such as when the sun 404 is shining. In such instances, the communicable coupling between the luminaires 200a and 200b may be used to reduce the luminous output of luminaire 200b when the photosensitive transducer 112a in luminaire 200a detects a high level of ambient illumination that is indicative of daylight outside of the parking garage 400. For example, upon sensing an ambient lighting condition indicative of daylight, the control subsystem 104 in luminaire 200a can reduce the luminous output of the light subsystems 106 to an energy conserving level and can also generate an output signal 330a that includes data indicative of the luminous output of the lighting subsystems 106. Upon receipt of the output signal 330a, machine executable code, rules, or logic can cause the control subsystem 104 in luminaire 200b to reduce the luminous output of the lighting subsystems 106 based solely upon the data contained in the output signal provided by luminaire 200a and even though luminaire 200b remains in a relatively low ambient light location within the parking garage 400. Importantly, in the absence of the machine executable code, rules, or logic and the output signal received from luminaire 200a, no such reduction in luminous output of luminaire 200b (and consequent energy savings attendant thereto) would occur.

In some instances, the machine executable code, rules, or logic may cause the microcontroller 210 in each of the luminaires 200a-200b to maintain luminaires 200a-200b can maintain a constant level of illumination level throughout each level of the parking garage 400. Such may be required to comply with local, state, federal or municipal codes, rules or regulations that specify minimum desired illumination levels for parking garages (e.g., a minimum of 2 foot-candles horizontal and 1 foot-candle vertical during daylight hours and a minimum of 1 foot-candle horizontal and 0.5 foot-candles vertical during evening hours). Operating the lighting subsystems 106 in luminaire 200b at maximum luminous output (e.g., 100%) during daylight hours, photosensitive transducer 112b on luminaire 200b may provide an output signal including data indicative of a sensed illumination level of 2.2 foot-candles horizontal and 1.1 foot-candles vertical. Upon receipt of the output signal including the sensed illumination levels provided by luminaire 200b, the machine executable code, rules, or logic may cause microcontroller 210 to reduce the luminous output of the lighting subsystems 106 in luminaire 200a to operate at a reduced luminous output (e.g., 60%) to match the luminous output of luminaire 200b. Such reduced luminous output can conserve energy by reducing the power consumption of luminaire 200a by taking advantage of the contribution of the ambient light provided by the sunlight 406 that is sensed by the photosensitive transducer 112b in luminaire 200a.

Advantageously, the communicably coupled, networked, luminaires 200 provide a system having tremendous built-in redundancy. For example, a failure of a photosensitive transducer 112b on any one luminaire 200 in a parking garage luminaire network may result in the luminaire 200 operating unpredictably or in an undesirable manner (e.g., remaining at 0% or 100% of rated or nominal output). By communicably coupling all of the luminaires 200 in the parking garage, based on address and physical location data, the luminaire with the failed photosensitive transducer 112b can select a similarly positioned neighboring luminaire 200 (e.g., a luminaire 200 at the same location on a different level of the parking garage). After selecting an appropriate neighboring luminaire 200, the luminaire with the failed photosensitive transducer 112b can mirror the luminous output of the selected neighboring luminaire 200.

Although only a small portion of a much larger parking garage 400 and two luminaires 200 are shown in FIG. 4, tens, hundreds, or even thousands of luminaires 200 may be disposed in a parking garage having two to twenty levels. Such structures are exemplified by the massive parking structures commonly found at large international airports and national or regional hub airports. Communicably coupling and networking all or a portion of the multitude of luminaires 200 present in such an environment can provide operational advantages, for example by autonomously increasing the luminous output of neighboring luminaires 200 to assist in covering a darkened area caused by a failed luminaire 200. Such may also advantageously provide economic advantages, for example by altering the luminous output of the lighting subsystems 106 in luminaires 200 with failed photosensitive transducers 112 responsive to the receipt of output signals from luminaires having operating photosensitive transducers 112. Such operational adjustments are made autonomously and selectively by the luminaires 200 forming the network based on the machine executable code, rules, or logic provided in the control subsystem 104 of each luminaire 200.

Figure 5:
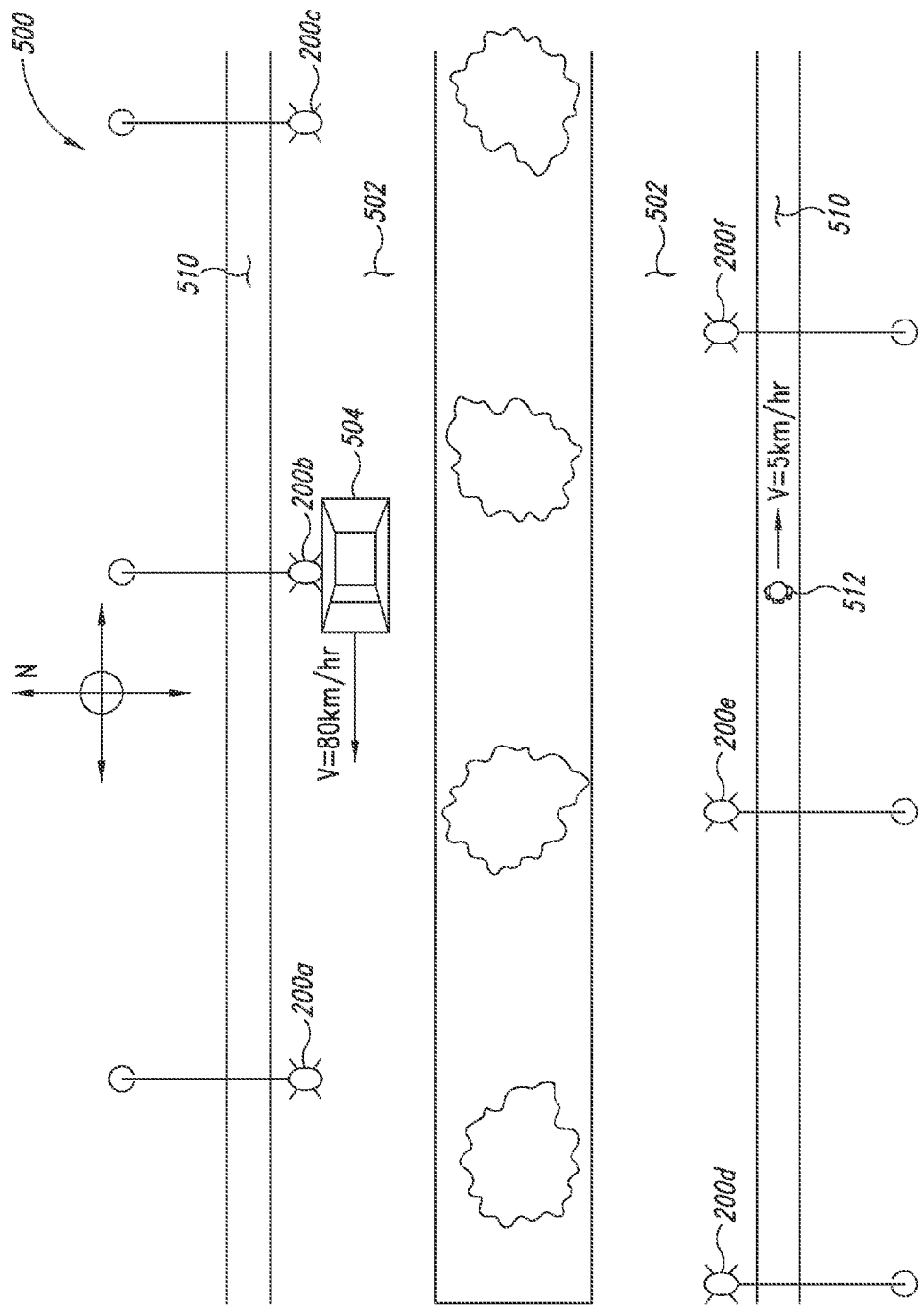
FIG. 5 is a plan view of an illustrative roadway and sidewalk illuminated using a plurality of luminaires, each including at least one external event sensor, according to one non-limiting illustrated embodiment.

FIG. 5 shows an illustrative illumination system 500 used to provide area illumination of a generally east-west roadway 502 on which vehicles 504 travel and a generally east-west sidewalk 510 on which pedestrians travel 512. A vehicle 504 is shown traveling in a westward direction at a velocity of 80 kilometers per hour (km/hr). A pedestrian 512 is shown traveling in an eastward direction at a velocity of 5 km/hr. Luminaires 200a-200c line the north side of the roadway 502 while luminaires 200d-200f (luminaires 200a-200f hereinafter collectively "luminaires 200") line the south side of the roadway 502. One or more motion sensors 112a and one or more photosensitive transducers 112b may be included in the control subsystem 104 of each of the respective luminaires 200. The roadway 502 can be a heavily used primary thoroughfare or an occasionally used country road. In at least some instances, the luminaires 200 can be individually addressed and the associated physical or geographic location of each of the luminaires 200 can be stored or otherwise retained in the control subsystem 104 in each of the respective luminaires 200.

In at least some instances, the luminous output of the luminaires 200 along the roadway 502 may be altered, adjusted or controlled by the microcontroller 210 responsive to the time of occurrence of an expected solar event, for example a sunset event or a sunrise event. Such times of occurrence of expected solar events may be calculated by the control subsystem 104, for example using geolocation and local date information in the sunrise equation, or using data look-up or retrieval based on geolocation and local date information. In other instances, the photosensitive transducer 112b can be use to sense the occurrence of ambient lighting conditions indicative of a sunset or sunrise events. The luminous output of luminaires 200 lining a primary thoroughfare experiencing sustained, 24 hour per day, traffic may be maintained at a defined level (e.g., 90% to 100% of rated or nominal output) between the sunset event and the sunrise event. The luminous output of luminaires 200 lining an occasionally used roadway may be maintained at a lower level of illumination (e.g., 40% to 60% of rated or nominal output) until motion in the form of vehicular 504 or pedestrian 512 traffic is detected by the motion sensor 112a.

The luminous output of the lighting subsystems 106 in each of the luminaires 200a-200c along the westbound roadway 502 can be altered, adjusted or controlled responsive to one or more parameters indicative of the motion of the vehicle 504. Upon detection of the direction of motion and optionally the velocity of the moving vehicle 504 by a first luminaire (e.g., luminaire 200c), the first luminaire 200c can generate a broadcast or targeted output signal including data indicative of the sensed motion of the vehicle 504, the sensed direction of motion of the vehicle 504, the sensed velocity of the vehicle 504 and the luminous output of the lighting subsystems 106 in luminaire 200c. Since the luminaires 200a-200c are communicably coupled and are physically or geographically mapped, luminaires 200a and 200b can determine that the motion of the vehicle 504 will result in the vehicle passing proximate each of a number of the luminaires.

If the velocity of the vehicle 504 is included in the output signal generated by luminaire 200c, luminaires 200a and 200b can determine either a differential (e.g., in 24 seconds based on a timing circuit) or absolute time (e.g., at 20:04:25 based on an RTC circuit) at which the vehicle 504 will arrive. Luminaires 200a and 200b are thus able to respond proactively to the motion of the vehicle 504 detected by luminaire 200c. For example, luminaires 200a and 200b can increase the luminous output of their respective lighting subsystems 106 before their respective motion sensors 112a detect the motion of the vehicle 504. In at least some instances, the number of luminaires 200 having an increased luminous output along the forward path of the vehicle 504 may be adjusted based at least in part on the velocity of the vehicle 504. For example, responsive to the receipt of an output signal including data indicative of a vehicle 504 traveling at a velocity of 80 km/hr the luminous output of five upcoming luminaires 200 may be increased, while responsive to the receipt of an output signal including data indicative of a vehicle 504 traveling at a velocity of 40 km/hr, the luminous output of three upcoming luminaires 200 may be increased. The luminous intensity of the lighting subsystems 106 may be decreased when the vehicle 504 is no longer proximate the respective luminaire 200a-200c.

In some instances, the rate of increase or decrease in luminous output of all or a portion of the luminaires 200a-200c may be altered, adjusted, or controlled responsive to one or more parameters indicative of motion of the vehicle 504. For example, the luminous output of the luminaires 200 in the forward path of a vehicle 504 moving at a high rate of speed may be rapidly increased to provide the greatest possible sight distance to the occupants of the vehicle 504. Similarly, the luminous output of the luminaires 200 in the rearward path of the vehicle 504 moving at a high rate of speed may be rapidly decreased since little need exists to maintain an increased illumination level to the rear of the vehicle 504.

The luminous output of the lighting subsystems 106 in each of the luminaires 200d-200f along the eastbound roadway 502 can be altered, adjusted or controlled responsive to one or more parameters indicative of the motion of the pedestrian 512. Upon detection of the direction of motion and optionally the velocity of the pedestrian 512 by a first luminaire (e.g., luminaire 200d), the first luminaire can generate a broadcast or targeted output signal including data indicative of the sensed motion of the pedestrian 512, the sensed direction of motion of the pedestrian 512, the sensed velocity of the pedestrian 512 and the luminous output of the lighting subsystems 106 in the first luminaire. Since the luminaires 200d-200f are communicably coupled and are physically or geographically mapped, luminaires 200e and 200f can determine that the motion of the pedestrian 512 will result in the pedestrian passing along a path proximate each of the luminaires. If the velocity of the pedestrian 512 is included in the output signal generated by luminaire 200d, luminaires 200e and 200f can determine either a differential (e.g., in 24 seconds based on a timing circuit) or absolute time (e.g., at 20:04:25 based on an RTC circuit) at which the pedestrian 512 will arrive. Luminaires 200e and 200f are thus able to respond proactively to the motion of the pedestrian 512 detected by luminaire 200d. For example, luminaires 200e and 200f can increase the luminous output of their respective lighting subsystems 106 before their respective motion sensors 112a detect the motion of the pedestrian 512. The luminous intensity of the lighting subsystems 106 may be decreased when the pedestrian 512 is no longer proximate the respective luminaire 200d-200f.

In some instances, the rate of increase or decrease in luminous output of the luminaires 200d-200f can be altered, adjusted, or controlled based on one or more parameters indicative of motion of the pedestrian 512. For example, the luminaires 200d-200f may be able to discern between pedestrian and vehicular traffic based on one or more parameters (e.g., size of object, velocity of object, location of object, etc.). Upon detecting a slow moving object having one or more characteristics of pedestrian traffic, the machine executable code, rules, or logic may cause the microcontrollers 210 in each of the luminaires 200d-200f to increase the luminous output of the lighting subsystems 106 in the luminaires 200e-200f in the path of the pedestrian at a defined time before the expected passage of the pedestrian proximate the luminaire 200e-200f. Such may improve the sense of security and well-being felt by the pedestrian 512 as the upcoming sidewalk 510 will be brightly illuminated prior to their arrival. Similarly, the decrease in luminous output of the luminaires 200 behind the pedestrian 512 may be delayed based on the relatively low velocity of the pedestrian 512 to maintain an increased illumination level to the rear of the pedestrian 512 thereby increasing the pedestrian's sense of safety and well-being.

In some instances, the machine executable code, rules, or logic may permit the microcontroller 210 to increase the luminous output of the lighting subsystems 106 to 100% of rated or nominal output in all or a number of the luminaires 200 along the roadway 502 upon receipt of one or more override or emergency signals. Such override or emergency signals may be wiredly or wirelessly transmitted to one or more luminaires 200 and transmitted to some or all of the communicably coupled luminaires 200. Such may be useful in assisting first responders and other emergency personnel responding to accidents or other events that have occurred on or proximate the roadway 502.

Figure 6:
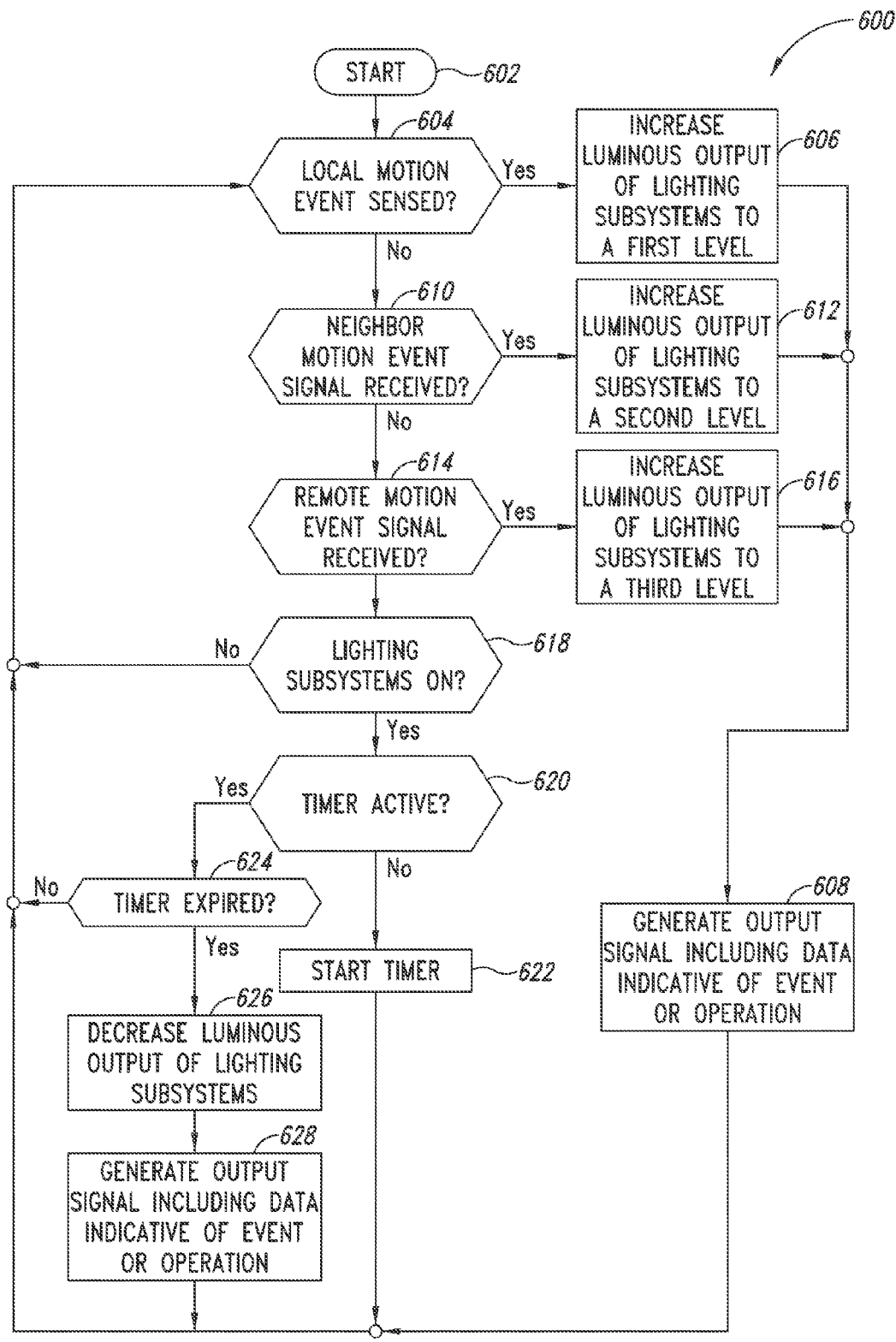
FIG. 6 is a high level flow diagram of illustrative machine executable code, rules, or logic useful in the autonomous operation of one or more communicably coupled, networked, luminaires, according to one non-limiting illustrated embodiment.

FIG. 6 shows an illustrative method 600 of controlling one or more networked luminaires 200, according to at least one illustrated embodiment. Upon detection of a local motion event by a luminaire 200 or upon receipt of a signal including data indicative of a motion event sensed by a neighbor luminaire or a remote luminaire by the luminaire 200, the control subsystem 104 in the luminaire 200 can increase the luminous output of the lighting subsystems 106. The luminaire 200 can also generate an output signal that includes data indicative of at least one of the motion event or one or more operating parameters of the luminaire 200 for transmission to one or more communicably coupled luminaires. After the motion event is no longer detected by the luminaire 200, a neighboring luminaire or a remote luminaire, the luminaire 200 can initiate a timer. If the timer expires without a motion event detected by the luminaire 200, the neighboring luminaire, or a remote luminaire, the control subsystem 104 in the luminaire 200 can reduce the luminous intensity of the lighting subsystems 106. Such a system can advantageously be used in applications where luminaires are used to provide illumination to promote the safe movement of objects within a defined area, for example movement of vehicles or pedestrians along a roadway, in a parking lot, or in a parking garage. The method commences at 602.

At 604, the microcontroller 210 determines if a local motion event has occurred in the vicinity of the luminaire 200. Such determination may be based on receipt of a signal from one or more sensors 112, for example a Doppler motion sensor, disposed in the control subsystem 104 of the luminaire 200. The local motion event may include at least one of: a change in distance between the luminaire 200 and an external object in the vicinity of the luminaire 200, a direction of motion of an external object in the vicinity of the luminaire 200, or a velocity of an external object in the vicinity of the luminaire 200. In at least some instances, one or more threshold values may be applied to categorize or classify the movement sensed by the at least one sensor 112. For example, machine executable code, rules, or logic used by the microcontroller 210 to discern motion of an external object in the vicinity of the luminaire may result in signals indicative of the motion of an object less than a defined mass threshold or smaller than a defined size threshold not being considered indicative of motion of an external object in the vicinity of the luminaire 200. Such filtering can advantageously reduce the occurrence of "false alarms" and resultant erroneous or inconsistent operation of the luminaire 200.

At 606, responsive to sensing the motion of an external object in the vicinity of the luminaire 200, the machine executable code, rules, or logic can cause the microcontroller 210 to increase the luminous output of the lighting subsystems 106 in luminaire 200 to a first level. The first level can include any level of luminous output from 1% to 100% of rated or nominal output. Adjusting the luminous output of the lighting subsystems 106 may, in some instances, take the form of increasing the duty cycle of a pulse width modulated ("PWM") drive signal (i.e., increasing the frequency, pulse width, or both) provided to the power converter 202 such that the power delivered to the lighting subsystems 106 is increased to the first level.

At 608, responsive to adjusting or altering the luminous output of the lighting subsystems 106, the machine executable code, rules, or logic can cause the microcontroller 210 to generate at least one output signal including data indicative of at least one of: one or more parameters related to the sensed motion event that occurred in the vicinity of the luminaire 200 or one or more operational parameters of the luminaire 200 (e.g., PWM drive signal parameters, luminous output parameters, power consumption parameters, etc.). The output signal so generated may be transmitted via the communications interface 114 as a targeted or broadcast output signal directed to some or all of the remaining luminaires in a communicably coupled network of luminaires. In some instances, the output signal may be targeted to only those luminaires previously addressed and identified as "neighboring luminaires." In other instances, the output signal so generated and transmitted may be targeted or broadcast to some or all of the remaining, remote, luminaires in the network.

At 610, the microcontroller 210 determines if an output signal including data indicative of motion of an object in the vicinity of a neighboring luminaire has been received from the neighboring luminaire at the communications interface 114. The output signal received from the neighboring luminaire can include at least one of the following: a change in distance between the neighboring luminaire and an external object in the vicinity of the neighboring luminaire, a direction of motion of an external object in the vicinity of the neighboring luminaire, or a velocity of an external object in the vicinity of the neighboring luminaire.

At 612, responsive to the receipt of the output signal including data indicative of motion of an object in the vicinity of the neighboring luminaire, the machine executable code, rules, or logic can cause the microcontroller 210 to increase the luminous output of the lighting subsystems 106 in luminaire 200 to a second level. The second level can include any level of luminous output from 1% to 100% of rated or nominal output. In some instances, the first level and second level may cause the same or substantially similar levels of luminous output from the lighting subsystems 106. Adjusting the luminous output of the lighting subsystems 106 may, in some instances, take the form of increasing the duty cycle of a pulse width modulated ("PWM") drive signal (i.e., increasing the frequency, pulse width, or both) provided to the power converter 202 such that the power delivered to the lighting subsystems 106 is increased to the second level.

At 614, the microcontroller 210 determines if an output signal including data indicative of motion of an object in the vicinity of a remote luminaire in the network has been received from the remote luminaire at the communications interface 114. The output signal received from the remote luminaire can include at least one of the following: a change in distance between the remote luminaire and an external object in the vicinity of the remote luminaire, a direction of motion of an external object in the vicinity of the remote luminaire, or a velocity of an external object in the vicinity of the remote luminaire.

At 616, responsive to the receipt of the output signal including data indicative of motion of an object in the vicinity of the remote luminaire, the machine executable code, rules, or logic can cause the microcontroller 210 to increase the luminous output of the lighting subsystems 106 in luminaire 200 to a third level. The third level can include any level of luminous output from 1% to 100% of rated or nominal output. In some instances, the first level, second level, and third level may cause the same or substantially similar levels of luminous output from the lighting subsystems 106. Adjusting the luminous output of the lighting subsystems 106 may, in some instances, take the form of increasing the duty cycle of a pulse width modulated ("PWM") drive signal (i.e., increasing the frequency, pulse width, or both) provided to the power converter 202 such that the power delivered to the lighting subsystems 106 is increased to the third level.

At 618, the microcontroller 210 determines whether any or all of the lighting subsystems 106 are illuminated. In some instances, the microcontroller 210 can determine whether the lighting subsystems 106 are illuminated based on the power consumption of the power converter 202. In some instances, the microcontroller 210 can determine whether the lighting subsystems 106 are illuminated based on a signal provided by a photosensitive transducer 112*b* in the control subsystem 104. In yet other instances, the microcontroller 210 can determined whether the lighting subsystems 106 are illuminated based on the duty cycle of the PWM drive signal provided to the power converter 202. If the lighting subsystems 106 have not been not illuminated the microcontroller 210 continues to scan for a local motion event in the vicinity of the luminaire 200, an output signal including data indicative of motion of an object in the vicinity of a neighboring luminaire, or an output signal including data indicative of motion of an object in the vicinity of a remote luminaire in the network.

If the lighting subsystems have previously been illuminated responsive to a local motion event in the vicinity of the luminaire 200, an output signal including data indicative of motion of an object in the vicinity of a neighboring luminaire, or an output signal including data indicative of motion of an object in the vicinity of a remote luminaire in the network, at 620 the microcontroller 210 determines whether a timer is active. In at least some instances, the machine executable code, rules, or logic maintain the luminous output of the lighting subsystems 106 at an elevated level after the local motion event in the vicinity of the luminaire 200, output signal including data indicative of motion of an object in the vicinity of a neighboring luminaire, or output signal including data indicative of motion of an object in the vicinity of a remote luminaire in the network indicate the object is no longer detected. Such an elevated illumination level may be maintained for a defined period of time. The timer may be used to determine whether the lighting subsystem has remained illuminated for at least the defined period of time after the local motion event in the vicinity of the luminaire 200, output signal including data indicative of motion of an object in the vicinity of a neighboring luminaire, or output signal including data indicative of motion of an object in the vicinity of a remote luminaire in the network indicate the object is no longer detected.

At 622, responsive to determining that a timer has not been activated at 620, the microcontroller 210 can start a timer. The timer can include a real time clock circuit 214 or a timer circuit 216. After starting the timer the microcontroller 210 continues to scan for a local motion event in the vicinity of the luminaire 200, an output signal including data indicative of motion of an object in the vicinity of a neighboring luminaire, or an output signal including data indicative of motion of an object in the vicinity of a remote luminaire in the network.

At 624, responsive to determining that a time has been activated, the machine executable code, rules, or logic cause the microcontroller 210 to determine whether an elapsed time measured by the timer has exceeded a defined timer threshold. In at least some instances, the defined timer threshold can be a single value, after which the microcontroller reduces the luminous output of the lighting subsystems 106. In other instances, the defined time threshold may include multiple values or a determined value to reduce the luminous output of the lighting subsystems 106 after a defined time that is based on one or more external factors. Such external factors may include the direction of motion of the external object, the velocity of the object, the size of the object, or any other measurable quantity or parameter associated with the object. If the microcontroller 210 determines that the timer has not yet exceeded the defined timer threshold, the microcontroller 210 continues to scan for a local motion event in the vicinity of the luminaire 200, an output signal including data indicative of motion of an object in the vicinity of a neighboring luminaire, or an output signal including data indicative of motion of an object in the vicinity of a remote luminaire in the network.

At 626, responsive to determining that the timer has exceeded the defined timer threshold, the machine executable code, rules, or logic can cause the microcontroller 210 to decrease the luminous output of the lighting subsystems 106. Additionally, at 628, the machine executable code, rules, or logic can further cause the microcontroller 210 to generate at least one output signal including data indicative of at least one of: one or more parameters related to the reduction in luminous intensity of the lighting subsystems 106. The output signal so generated may be transmitted via the communications interface 114 as a targeted or broadcast output signal directed to some or all of the remaining luminaires in a communicably coupled network of luminaires. In some instances, the output signal may be targeted to only those luminaires previously addressed and identified as "neighboring luminaires." In other instances, the output signal so generated and transmitted may be targeted or broadcast to some or all of the remaining, remote, luminaires in the network. After generating the output signal at 628, the microcontroller 210 continues to scan for a local motion event in the vicinity of the luminaire 200, an output signal including data indicative of motion of an object in the vicinity of a neighboring luminaire, or an output signal including data indicative of motion of an object in the vicinity of a remote luminaire in the network.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microcontrollers), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S.

Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25, 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010, U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590 filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321 filed Mar. 2, 2012; U.S. Provisional Patent Application Ser. No. 61/640,963, filed May 1, 2012; U.S. Non-Provisional patent application Ser. No. 13/558,191 filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327 filed Sep. 5, 2012; U.S. Provisional Patent Application Ser. No. 61/723,675, filed Nov. 7, 2012; and are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. An illumination system, comprising:
 a luminaire including at least one light source disposed at least partially in a housing;
 at least one motion sensor proximate the housing that provides a signal indicative of a velocity of an object which is remote from the luminaire and external to the luminaire;
 a controller communicably coupled to the at least one light source and the at least one motion sensor, the controller includes defined logic to autonomously operate the at least one light source responsive to the signal indicative of the velocity of the object provided by the at least one motion sensor; and
 a communications transceiver communicably coupled to the controller to communicate with at least one other luminaire;
 wherein, responsive to receipt of the signal indicative of the velocity of the object provided by the at least one motion sensor, the controller selectively autonomously communicates at least one signal via the communications transceiver to at least one selected recipient luminaire in physical proximity to the luminaire which causes the at least one selected recipient luminaire to control the illumination thereof based at least in part on the velocity of the object to provide illumination for the object.

2. The illumination system of claim 1, further comprising at least two sensors communicably coupled to the controller, a least one of the at least two sensors detects the occurrence of at least one event external to the luminaire.

3. The illumination system of claim 2 wherein the at least two sensors comprise a photosensitive transducer to provide a signal indicative of an ambient light condition external to the luminaire.

4. The illumination system of claim 3 wherein the defined logic further autonomously operates the light source responsive to the signal indicative of the ambient light condition external to the luminaire.

5. The illumination system of claim 1 wherein the signal indicative of the velocity of the object includes a signal indicative of the velocity of the object provided by the at least one other luminaire via the communications transceiver.

6. The illumination system of claim 1 wherein the controller further comprises at least one time-keeping circuit.

7. The illumination system of claim 1 wherein the controller identifies one of a plurality of luminaires as closest in physical proximity to the luminaire.

8. The illumination system of claim 7 wherein the controller autonomously retransmits the signal indicative of the velocity of the object to the one identified closest luminaire.

9. The illumination system of claim 1 wherein the luminaire comprises one of a plurality of luminaires, the controller in each of the plurality of luminaires having an identifier known to at least one other of the plurality of luminaires.

10. The illumination system of claim 9 wherein the at least one signal is addressed to the at least one selected recipient luminaire using the respective identifier of the at least one selected recipient luminaire.

11. The illumination system of claim 10 wherein the at least one recipient luminaire includes at least one luminaire identified by the controller as closest in physical proximity to the luminaire.

12. The illumination system of claim 1 wherein the at least one light source includes at least one solid-state light source.

13. An illumination system comprising:
 a luminaire including at least one light source disposed at least partially in a housing;
 a controller with defined logic to selectively autonomously operate the at least one light source to provide illumination for an object responsive to a signal indicative of a velocity of the object remote from the luminaire, the signal indicative of the velocity of the object provided by at least one other luminaire;
 a communications transceiver communicably coupled to the controller to communicate with the at least one other luminaire; and
 at least one sensor communicably coupled to the controller and physically coupled to the housing, to detect the occurrence of at least one event external to the luminaire and to selectively autonomously operate the at least one light source responsive to the detection of the at least one event external to the luminaire.

14. The illumination system of claim 13 wherein the at least one sensor includes at least one motion sensor to provide a signal indicative of motion proximate the luminaire.

15. The illumination system of claim 14 wherein the at least one sensor further includes at least one photosensitive transducer to provide a signal indicative of an ambient illumination condition external to the luminaire.

16. The illumination system of claim 15 wherein the controller selectively autonomously operates the at least one light source responsive at least in part to the signal indicative of the ambient illumination condition external to the luminaire.

17. The illumination system of claim 15 wherein the controller further selectively autonomously operates the at least one light source responsive to the signal indicative of the ambient illumination condition external to the luminaire in the absence of a signal indicative of the velocity of the object, and selectively autonomously operates the at least one light source responsive to the signal indicative of the velocity of the object when the signal indicative of the velocity of the object is present.

18. The illumination system of claim 14 wherein the controller further comprises a communicably coupled time-keeping circuit and wherein the controller further selectively autonomously operates the at least one light source in coordination with a determined time of occurrence of an expected solar event including at least one of: an expected sunset event or an expected sunrise event.

19. The illumination system of claim 18 wherein the defined logic further autonomously operates the at least one light source in coordination with the determined time of occurrence of an expected solar event in the absence of a signal indicative of the velocity of the object, and autonomously operates the at least one light source in coordination with the signal indicative of the velocity of the object when the signal indicative of the velocity of the object is present.

20. The illumination system of claim 13 wherein the signal indicative of the velocity of the object includes a signal indicative of the velocity of the object provided by the at least one other luminaire via the communications transceiver.

21. The illumination system of claim 13 wherein the at least one other luminaire includes at least one of a plurality of luminaires determined by the controller as being closest in physical proximity to the luminaire.

22. The illumination system of claim 21 wherein the defined logic causes the controller to further autonomously retransmit the signal indicative of the velocity of the object to the at least one other luminaire.

23. The illumination system of claim 13 wherein the luminaire comprises one of a plurality of luminaires, the controller in each of the plurality of luminaires having an identifier known to at least one other of the plurality of luminaires.

24. The illumination system of claim 23 wherein the defined logic causes the controller to further selectively autonomously communicate the at least one signal via the communications transceiver to at least one selected recipient luminaire, the at least one signal addressed to the at least one selected recipient luminaire using the respective identifier of the at least one selected recipient luminaire.

25. The illumination system of claim 24 wherein the at least one other luminaire includes at least one of a plurality of luminaires determined by the controller as being closest in physical proximity to the luminaire.

26. The illumination system of claim 13 wherein the at least one light source includes at least one solid-state light source.

27. A method of controlling a plurality of luminaires, comprising:
receiving from another of the plurality of luminaires at a controller via a communicably coupled communications transceiver at least one signal including information indicative of at least velocity of an object which is remote from a luminaire and external to the luminaire, the luminaire at least partially housing the controller and the communications transceiver;
autonomously adjusting by the controller a luminous output of at least one light source to provide illumination for the object in response to the receipt of the information indicative of at least the velocity of the object; and
autonomously communicating via the communications transceiver communicably coupled to the controller at least one signal including information indicative of at least one of: the velocity of the object or the luminous output of the luminaire.

28. The method of claim 27 wherein receiving information indicative of at least the velocity of the object includes receiving a signal including information indicative of a direction of motion of the object.

29. The method of claim 28 wherein receiving a signal including information indicative of at least the velocity of the object includes receiving a signal from at least one other of the plurality of luminaires via the communications transceiver communicably coupled to the controller.

30. The method of claim 28 wherein receiving a signal including information indicative of at least the velocity of the object includes receiving a signal including information indicative of at least the velocity of the object as determined by a single motion sensor.

31. The method of claim 30 wherein receiving the signal indicative of at least the velocity of the object includes receiving information provided by at least two of the plurality of luminaires based at least in part on a physical distance between the at least two luminaires and a time required by the object to transit the physical distance between the at least two luminaires.

32. The method of claim 28 wherein receiving a signal including information indicative of at least the velocity of the object includes receiving a signal from at least one motion sensor communicably coupled to the controller and disposed at least partially within the luminaire.

33. The method of claim 32 wherein receiving the signal indicative of at least the velocity of the object includes receiving information indicative a change in distance between the at least one motion sensor and the object over a defined time interval.

34. The method of claim 28, further comprising selectively autonomously adjusting by the controller in each of a number of selected luminaires the luminous output of each of the respective number of the selected luminaires based at least in part on at least one of the velocity of the object or the direction of motion of the object.

35. The method of claim 34, further comprising selectively autonomously adjusting by the controller in each of the number of selected luminaires a rate of change in the luminous output of each of the respective number of the selected luminaires based at least in part on at least one of the velocity of the object or the direction of motion of the object.

36. The method of claim 35 wherein selectively autonomously adjusting a rate of change in the luminous output of each of the number of the selected luminaires includes adjusting the rate of change in the luminous output of the number of the selected luminaires based on the velocity and the direction of motion of the object.

37. The method of claim 36 wherein, responsive to receipt of a signal indicating a motion towards the number of selected luminaires, the rate of change in the luminous output of the number of selected luminaires is adjusted by autonomously increasing the rate at which the luminous output is increased in proportion to the velocity of the object.

38. The method of claim 36 wherein, responsive to receipt of a signal indicating a motion away from the number of selected luminaires, the rate of change in the luminous output of the number of selected luminaires is adjusted by autonomously increasing the rate at which the luminous output is decreased in inverse proportion to the velocity of the object.

39. The method of claim 28 wherein autonomously communicating at least one signal including information indicative of at least one of: the velocity of the object or the luminous output of the luminaire includes selectively transmitting at least one signal addressed to at least one selected recipient luminaire.

40. The method of claim 39 wherein selectively transmitting at least one signal addressed to at least one selected recipient luminaire includes selectively transmitting at least one signal to a selected recipient luminaire having the closest physical proximity to the luminaire.

41. The method of claim 39 wherein selectively transmitting at least one signal addressed to at least one selected recipient luminaire includes selectively transmitting at least one signal to a selected, defined, cell containing a number of recipient luminaires selected from the plurality of luminaires based on at least one of: an identifier assigned to each of the respective selected luminaires or a physical location of each of the respective selected luminaires.

42. The method of claim 27 wherein adjusting a luminous output of at least one light source in response to the receipt of the signal including information indicative of at least the velocity of the object includes: autonomously increasing the luminous output of the at least one light source upon the receipt of the at least one signal, and autonomously decreasing the luminous output of the at least one light source a defined amount of time after a loss of the at least one signal.

43. The method of claim 27, further comprising:
apportioning the plurality of luminaires into a number of cells based on at least one of: an identifier assigned to each of the plurality of luminaires or a physical location of each of the plurality of luminaires, each of the number of cells including at least one luminaire;
communicating to each of the luminaires in at least one cell the signal including information indicative of at least the velocity of an object external to the luminaire; and
responsive to the receipt of the signal, adjusting the luminous output of each of the luminaires in the cell.

44. The method of claim 27, further comprising:
receiving by the controller at least one signal including information indicative a sensed ambient illumination level external to the at least one luminaire; and
adjusting by the controller a luminous output of the at least one light source in response to the receipt of the information indicative of the sensed ambient illumination level.

45. The method of claim 44 wherein receiving by the controller at least one signal including information indicative a sensed ambient illumination level external to the at least one luminaire includes receiving a signal from at least one other of the plurality of luminaires via the communications transceiver.

46. The method of claim 44 wherein receiving by the controller at least one signal including information indicative a sensed ambient illumination level external to the at least one luminaire includes receiving a signal from a photosensitive transducer communicably coupled to the controller and disposed at least partially in the luminaire.

47. The method of claim 46 wherein adjusting a luminous output of the at least one light source includes adjusting the luminous output of the at least one light source to maintain the ambient illumination level as sensed by the photosensitive transducer in a defined range.

48. The method of claim 47 wherein the defined range includes the level of illumination provided by at least one other of the plurality of luminaires as measured by photosensitive transducer on the at least one other luminaire and communicated to the controller by the at least one other luminaire.

49. The method of claim 4, further comprising:
transmitting a signal including data indicative of the luminous output of the luminaire to at least one other of the plurality of luminaires.

50. A method of controlling a plurality of luminaires, comprising:
communicably coupling each of a plurality of luminaires to at least one other of the plurality of luminaires to provide at least one communication path between any two luminaires of all of the plurality of luminaires, where there are at least three luminaires in the plurality of luminaires;
receiving at a controller via a communicably coupled communications transceiver at least one signal including information indicative of at least velocity of an object external to a luminaire that houses the controller and the communications transceiver;
autonomously adjusting by the controller a luminous output of at least one light source in the luminaire to provide illumination for the object in response to the receipt of the information indicative of at least the velocity of the object; and
autonomously communicating by the controller via the communications transceiver the at least one signal to at least one other recipient luminaire in the plurality of luminaires, the at least one signal including information indicative of at least one of: at least the velocity of the object or the luminous output of the luminaire.

51. The method of claim 50 wherein receiving at least one signal including information indicative of at least the velocity of an object external to a luminaire includes receiving the at least one signal from at least one other luminaire in the plurality of luminaires.

52. The method of claim 50 wherein receiving at least one signal including information indicative of at least the velocity of an object external to a luminaire includes receiving the at least one signal from at least one sensor communicably coupled to the controller where the at least one sensor is not part of one of the other luminaires.

53. The method of claim 50 wherein autonomously communicating the at least one signal to at least one other recipient luminaire in the plurality of luminaires includes selectively autonomously communicating the at least one signal along with data indicative of the identity of the luminaire to the selected recipient luminaire.

54. The method of claim 53 wherein autonomously communicating the at least one signal to at least one other recipient luminaire in the plurality of luminaires further includes selectively autonomously communicating the at least one signal along with data indicative of the identity of the luminaire addressed to one or more selected recipient luminaires.

55. The method of claim 53 wherein autonomously communicating the at least one signal to at least one other recipient luminaire in the plurality of luminaires further includes selectively autonomously communicating the at least one signal along with data indicative of the identity of the luminaire to a defined cell containing a number of recipient luminaires selected from the plurality of luminaires based on at least one of: an identifier assigned to each of the respective recipient luminaires or a physical location of each of the respective recipient luminaires.

56. The method of claim 50 wherein autonomously communicating the at least one signal to at least one other recipient luminaire in the plurality of luminaires includes selectively autonomously communicating the at least one signal including data indicative of the identity of the luminaire to one or more selected recipient luminaires.

57. The method of claim 56, further comprising:
determining by the recipient luminaire a velocity of the object based on a spatial distance between the luminaire and the recipient luminaire and an elapsed time between receipt of the at least one signal and detection of the object by the recipient luminaire.

58. The method of claim 50 wherein each of the luminaires in the plurality of luminaires includes at least one time-keeping circuit to temporally synchronize each of the plurality of luminaires.

59. The method of claim 58 wherein autonomously communicating the at least one signal to at least one other recipient luminaire in the plurality of luminaires includes selectively autonomously communicating the at least one signal including data indicative of the velocity of the object, data indicative of the identity of the luminaire and data indicative of the time of detection by the luminaire to one or more selected recipient luminaires.

60. The method of claim 59, further comprising:
determining by the recipient luminaire an expected time of arrival of the object based on a spatial distance between the luminaire and the recipient luminaire and the velocity of the object.

61. A method of controlling a plurality of luminaires, comprising:
apportioning the plurality of luminaires into a number of cells based on at least one of: an identifier assigned to each of the respective luminaires in the plurality of luminaires or a physical location of each of the respective selected luminaires in the plurality of luminaires, each of the number of cells including at least one luminaire;
directly or indirectly communicably coupling each of the luminaires within a cell with all other luminaires in the cell;
directly communicably coupling at least one bridge luminaire in each cell with at least one other bridge luminaire in a different cell, wherein any one of the plurality of luminaires in a first cell is communicably coupled with any other of the plurality of luminaires in a second cell via the direct communicable coupling between a bridge luminaire in the first cell and a bridge luminaire in the second cell;
receiving at a luminaire in a first cell at least one signal including information indicative of at least one motion-related parameter of an object external to the luminaire;
autonomously adjusting a luminous output of the luminaire in response to the receipt of the information indicative of the at least one motion-related parameter of the object; and
autonomously communicating at least one signal to at least one other recipient luminaire in the plurality of luminaires, the at least one signal including information indicative of at least one of: the at least one motion-related parameter of the object or the luminous output of the luminaire.

62. The method of claim 61, further comprising:
adjusting the luminous output of all luminaires in the recipient luminaire cell responsive to receipt of the at least one signal.

63. The method of claim 62, further comprising:
retransmitting the at least one signal by the recipient luminaire to a second recipient luminaire in a different cell than the recipient luminaire via the communicable coupling between the respective bridge luminaires in the recipient luminaire cell and the second recipient luminaire cell.

* * * * *

UNITED STATES PATENT AND TRADEMARK OFFICE
CERTIFICATE OF CORRECTION

PATENT NO. : 9,210,759 B2  
APPLICATION NO. : 13/786332  
DATED : December 8, 2015  
INVENTOR(S) : William G. Reed Page 1 of 1

It is certified that error appears in the above-identified patent and that said Letters Patent is hereby corrected as shown below:

Claims

Column 40, Line 14, Claim 49:
"49. The method of claim 4, further comprising:" should read, --49. The method of claim 27, further comprising:--.

Signed and Sealed this
Fifth Day of July, 2016

Michelle K. Lee
*Director of the United States Patent and Trademark Office*